US011627542B2

(12) United States Patent
Sengupta et al.

(10) Patent No.: US 11,627,542 B2
(45) Date of Patent: Apr. 11, 2023

(54) BEAM RESELECTION FOR NARROWBAND NON-TERRESTRIAL NETWORKS

(71) Applicant: QUALCOMM Incorporated, San Diego, CA (US)

(72) Inventors: Ayan Sengupta, San Diego, CA (US); Alberto Rico Alvarino, San Diego, CA (US); Bharat Shrestha, San Diego, CA (US); Le Liu, Fremont, CA (US); Xiao Feng Wang, San Diego, CA (US); Peter Gaal, San Diego, CA (US); Liangping Ma, San Diego, CA (US); Umesh Phuyal, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/372,145

(22) Filed: Jul. 9, 2021

(65) Prior Publication Data

US 2022/0022146 A1 Jan. 20, 2022

Related U.S. Application Data

(60) Provisional application No. 63/051,720, filed on Jul. 14, 2020.

(51) Int. Cl.
*H04W 56/00* (2009.01)
*H04B 7/0408* (2017.01)
*H04B 7/06* (2006.01)
*H04W 84/06* (2009.01)
*H04L 27/26* (2006.01)
*H04B 7/185* (2006.01)
(Continued)

(52) U.S. Cl.
CPC ........ *H04W 56/001* (2013.01); *H04B 7/0408* (2013.01); *H04B 7/0695* (2013.01); *H04W 84/06* (2013.01)

(58) Field of Classification Search
CPC .............. H04W 56/001; H04W 84/06; H04W 56/0015; H04B 7/0408; H04B 7/0695;
(Continued)

(56) References Cited

U.S. PATENT DOCUMENTS 9,706,417 B2 * 7/2017 Nigam ................ H04W 48/16
10,826,599 B1 * 11/2020 Roy ..................... H04B 7/2125
(Continued)

FOREIGN PATENT DOCUMENTS

WO   WO-2020030715 A1   2/2020

OTHER PUBLICATIONS

International Search Report and Written Opinion—PCT/US2021/041315—ISA/EPO—dated Oct. 21, 2021 (206139WO).

*Primary Examiner* — Harry H Kim
(74) *Attorney, Agent, or Firm* — Holland & Hart LLP

(57) ABSTRACT

Methods, systems, and devices for wireless communications are described. A user equipment (UE) and a satellite of a non-terrestrial network (NTN) may establish communications on a beam of the satellite. The UE may receive, on a first carrier of a first set of carriers associated with a first beam, a configuration for the first set of carriers associated with the first beam and a second set of carriers associated with a second beam. The first carrier may be used to send a first set of synchronization signals, and a second carrier of the second set of carriers may be used to send a second set of synchronization signals. The UE may identify some system information associated with the second set of carriers based on the configuration and reselect to the second beam based on the configuration.

30 Claims, 18 Drawing Sheets

(51) Int. Cl.
*H04B 7/204* (2006.01)
*H04L 5/00* (2006.01)

(58) Field of Classification Search
CPC .......................... H04B 7/1851; H04B 7/18519;
H04B 7/2041; H04L 27/26025; H04L
5/001; H04L 5/0048; H04L 27/2657
See application file for complete search history.

(56) References Cited

U.S. PATENT DOCUMENTS

| | | | |
|---|---|---|---|
| 11,316,579 B2* | 4/2022 | Guan | H04L 5/0051 |
| 2015/0173004 A1* | 6/2015 | Nigam | H04W 56/001 |
| | | | 370/331 |
| 2019/0124533 A1* | 4/2019 | Tenny | H04L 5/0048 |
| 2019/0223126 A1* | 7/2019 | Liu | H04W 56/00 |
| 2019/0245606 A1* | 8/2019 | Ha | H04B 7/088 |
| 2020/0052782 A1 | 2/2020 | Wang et al. | |
| 2021/0051658 A1* | 2/2021 | Park | H04W 16/14 |
| 2021/0195589 A1* | 6/2021 | Immonen | H04W 56/001 |
| 2021/0288771 A1* | 9/2021 | Kim | H04L 5/0007 |
| 2021/0306055 A1* | 9/2021 | Farag | H04B 7/0695 |
| 2021/0352649 A1* | 11/2021 | Kim | H04W 72/042 |
| 2021/0392505 A1* | 12/2021 | Harada | H04W 74/0808 |
| 2022/0159593 A1* | 5/2022 | Jeon | H04B 7/0695 |
| 2022/0173848 A1* | 6/2022 | Guan | H04B 7/0695 |
| 2022/0271818 A1* | 8/2022 | Svendsen | H04B 7/0897 |

* cited by examiner

US 11,627,542 B2

BEAM RESELECTION FOR NARROWBAND NON-TERRESTRIAL NETWORKS

CROSS REFERENCE

The present application for patent claims the benefit of U.S. Provisional Patent Application No. 63/051,720 by Sengupta et al., entitled "BEAM RESELECTION FOR NARROWBAND NON-TERRESTRIAL NETWORKS," filed Jul. 14, 2020, assigned to the assignee hereof, and expressly incorporated by reference herein.

FIELD OF TECHNOLOGY

The following relates to wireless communications, including beam reselection for narrowband non-terrestrial networks (NTNs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate signals with a transmission and reception point, such as a satellite in a non-terrestrial network (NTN). The transmission and reception point may use multiple beams with different frequencies. In some cases, a different beam may provide better channel conditions for the UE. Some techniques for reselecting to different beams can be improved.

SUMMARY

The described techniques relate to improved methods, systems, devices, and apparatuses that support beam reselection for narrowband non-terrestrial networks (NTNs). Generally, the described techniques provide for efficient beam reselection for a UE communicating with a satellite without the UE re-obtaining all of the system information, reducing the power consumption at the UE. When a UE accesses a beam, the UE may obtain system information on the beam. In some cases, the UE may receive a configuration indicating, for example, some part of system information, some synchronization information corresponding to other beams, or both. For example, the UE may identify system information which is common between a currently selected beam and other beams of the satellite, or the UE may be indicated frequency information for the other beams.

In some cases, each beam of the satellite may include one or more carriers. For example, each beam of a satellite may include at least one carrier (e.g., an anchor carrier) which carries synchronization signals, system information, or both. The satellite may provide one or more cells, where each cell may include one or more sets of carriers. Each set of carriers may correspond to a different beam of the satellite. When the UE accesses an anchor carrier and reads system information on the anchor carrier, the UE may be able to obtain information about other (e.g., neighboring) beams or sets of carriers. In some cases, the UE may obtain information about other beams, or sets of carriers, within the same cell. Additionally, or alternatively, the UE may identify system information which is specific to another set of carriers. In some additional, or alternative, examples, the UE may obtain information about beams, or sets of carriers, in different cells. For example, the UE may identify system information that is common with carrier groups in different cells or identify anchor carrier frequencies for different sets of carriers in other cells.

The UE may reselect from a first set of carriers to a second set of carriers based on the system information received on the anchor carrier of the first set of carriers. The UE may already have some system information or synchronization information for the second set of carriers, so the UE may not perform a full system information read to make the reselection. In some cases, the UE may be configured to switch, or reselect, beams based on an indication in a connected mode of operation over downlink control information (DCI) or a medium access control (MAC) control element (CE). In some cases, the UE may be configured with parameters for an idle mode beam or cell reselection, and the UE may perform an idle mode reselection based on the parameters. The beam reselection may be inter-cell (e.g., between carriers, or sets of carriers, of different cells) or intra-cell (e.g., between carriers, or sets of carriers, of a cell).

A method of wireless communications at a UE is described. The method may include receiving, on a first carrier of a first set of carriers associated with a first beam of a transmitting terminal, a configuration for the first set of carriers associated with the first beam and a second set of carriers associated with a second beam of the transmitting terminal, where the first carrier conveys a first set of synchronization signals, and identifying at least a portion of a carrier group configuration for the second set of carriers based on the configuration.

An apparatus for wireless communications at a UE is described. The apparatus may include a processor, memory coupled with the processor, and instructions stored in the memory. The instructions may be executable by the processor to cause the apparatus to receive, on a first carrier of a first set of carriers associated with a first beam of a transmitting terminal, a configuration for the first set of carriers associated with the first beam and a second set of carriers associated with a second beam of the transmitting terminal, where the first carrier conveys a first set of synchronization signals, and identify at least a portion of a carrier group configuration for the second set of carriers based on the configuration.

Another apparatus for wireless communications at a UE is described. The apparatus may include means for receiving, on a first carrier of a first set of carriers associated with a first beam of a transmitting terminal, a configuration for the first set of carriers associated with the first beam and a second set of carriers associated with a second beam of the transmitting terminal, where the first carrier conveys a first set of synchronization signals, and identifying at least a portion of a carrier group configuration for the second set of carriers based on the configuration.

A non-transitory computer-readable medium storing code for wireless communications at a UE is described. The code may include instructions executable by a processor to receive, on a first carrier of a first set of carriers associated with a first beam of a transmitting terminal, a configuration for the first set of carriers associated with the first beam and a second set of carriers associated with a second beam of the transmitting terminal, where the first carrier conveys a first set of synchronization signals, and identify at least a portion of a carrier group configuration for the second set of carriers based on the configuration.

In some examples of the method, apparatuses, and non-transitory computer-readable medium described herein, a second carrier of the second set of carriers conveys a second set of synchronization signals.

In some examples of the method, apparatuses, and non-transitory computer-readable medium described herein, receiving the configuration may include operations, features, means, or instructions for receiving system information on the first carrier, where the system information corresponds to one or more carriers in one or more beams including at least the first and second beams.

In some examples of the method, apparatuses, and non-transitory computer-readable medium described herein, receiving the configuration may include operations, features, means, or instructions for receiving a cell configuration for a cell including at least the first set of carriers and the second set of carriers, where the cell configuration includes at least configurations for the first set of carriers and the second set of carriers.

Some examples of the method, apparatuses, and non-transitory computer-readable medium described herein may further include operations, features, means, or instructions for receiving a common system information on the first carrier for the cell, where the common system information may be applied for at least the first set of carriers and the second set of carriers.

Some examples of the method, apparatuses, and non-transitory computer-readable medium described herein may further include operations, features, means, or instructions for receiving a second system information for the second set of carriers, where a first received system information for the first set of carriers may be at least partially different from the second system information for the second set of carriers.

Some examples of the method, apparatuses, and non-transitory computer-readable medium described herein may further include operations, features, means, or instructions for receiving an indication of at least one carrier frequency corresponding to at least one carrier in the second set of carriers.

In some examples of the method, apparatuses, and non-transitory computer-readable medium described herein, the indication of the carrier frequency includes a frequency shift value from the first set of carriers.

In some examples of the method, apparatuses, and non-transitory computer-readable medium described herein, a second carrier of the second set of carriers may be frequency shifted from the first carrier based on the frequency shift value, or where each carrier of the second set of carriers may be frequency shifted from corresponding carriers of the first set of carriers based on the frequency shift value.

In some examples of the method, apparatuses, and non-transitory computer-readable medium described herein, the indication of the carrier frequency includes one or more absolute radio frequency channel numbers (ARFCNs) for the at least one carrier in the second set of carriers.

In some examples of the method, apparatuses, and non-transitory computer-readable medium described herein, the configuration includes scheduling information for at least a portion of system information associated with the second set of carriers.

In some examples of the method, apparatuses, and non-transitory computer-readable medium described herein, receiving the configuration may include operations, features, means, or instructions for receiving a cell configuration on the first set of carriers for a second cell including at least the second set of carriers, where a first cell includes at least the first set of carriers.

In some examples of the method, apparatuses, and non-transitory computer-readable medium described herein, the cell configuration includes an indication of at least one carrier frequency corresponding to at least one carrier in the second set of carriers.

In some examples of the method, apparatuses, and non-transitory computer-readable medium described herein, the cell configuration for the second cell includes scheduling information for at least a portion of system information associated with the second cell.

In some examples of the method, apparatuses, and non-transitory computer-readable medium described herein, the cell configuration includes a set of cell configurations for a set of cells, where the set of cells includes at least the first cell and the second cell.

In some examples of the method, apparatuses, and non-transitory computer-readable medium described herein, the cell configuration includes system information that may be common for a set of cells.

Some examples of the method, apparatuses, and non-transitory computer-readable medium described herein may further include operations, features, means, or instructions for receiving identifiers for one or more corresponding cells of the set of cells at least partially having common system information.

Some examples of the method, apparatuses, and non-transitory computer-readable medium described herein may further include operations, features, means, or instructions for identifying a first portion of common system information among carriers of the first cell and a second portion of common system information among a first one or more carriers of the first cell and a second one or more carriers of the second cell, where the first portion of common system information may be different from the second portion of common system information.

In some examples of the method, apparatuses, and non-transitory computer-readable medium described herein, receiving the configuration may include operations, features, means, or instructions for receiving an indication of one or more carriers of one or more sets of carriers, where each carrier of the one or more carriers conveys corresponding sets of synchronization signals, and where the one or more carriers may be indicated as candidate carriers corresponding to different beams for a beam reselection.

Some examples of the method, apparatuses, and non-transitory computer-readable medium described herein may further include operations, features, means, or instructions for receiving a beam reselection indication to reselect to one of the candidate carriers, where the reselecting may be based on the beam reselection indication.

In some examples of the method, apparatuses, and non-transitory computer-readable medium described herein, the beam reselection indication may be received via DCI, a MAC CE, or both.

In some examples of the method, apparatuses, and non-transitory computer-readable medium described herein, each candidate carrier belongs to a same cell as the first carrier or belongs to a different cell from the first carrier.

Some examples of the method, apparatuses, and non-transitory computer-readable medium described herein may further include operations, features, means, or instructions for reselecting to a second carrier of the second set of carriers based on the configuration for the second set of carriers, and receiving a second set of synchronization signals on the second carrier of the second set of carriers based on the configuration for the second set of carriers.

Some examples of the method, apparatuses, and non-transitory computer-readable medium described herein may further include operations, features, means, or instructions for reselecting to a second carrier of the second set of carriers based on the configuration for the second set of carriers, and receiving a paging message on the second carrier prior to receiving a system information block (SIB) on the second carrier based on the configuration.

In some examples of the method, apparatuses, and non-transitory computer-readable medium described herein, receiving the configuration may include operations, features, means, or instructions for receiving an idle mode beam reselection configuration.

In some examples of the method, apparatuses, and non-transitory computer-readable medium described herein, the idle mode beam reselection configuration includes a first set of parameters for inter-cell reselection and a second set of parameters for intra-cell reselection, where the parameters include one or more of a threshold, an offset, or a hysteresis.

In some examples of the method, apparatuses, and non-transitory computer-readable medium described herein, the first set of carriers and the second set of carriers correspond to a first cell, or the first set of carriers corresponds to the first cell and the second set of carriers corresponds to a second cell.

Some examples of the method, apparatuses, and non-transitory computer-readable medium described herein may further include operations, features, means, or instructions for reselecting to a second carrier of the second set of carriers while operating in an idle mode based on the idle mode beam reselection configuration.

In some examples of the method, apparatuses, and non-transitory computer-readable medium described herein, the idle mode beam reselection configuration includes a first set of parameters for inter-cell reselection among cells within a cell group and a second set of parameters for inter-cell reselection among cells across different cell groups, where the first set of parameters and the second set of parameters include one or more of a threshold, an offset, or a hysteresis.

In some examples of the method, apparatuses, and non-transitory computer-readable medium described herein, receiving the configuration may include operations, features, means, or instructions for receiving a master information block (MIB) specific to a corresponding set of carriers.

In some examples of the method, apparatuses, and non-transitory computer-readable medium described herein, the MIB may be specific to the first set of carriers, the second set of carriers, or another set of carriers.

In some examples of the method, apparatuses, and non-transitory computer-readable medium described herein, the MIB may be specific to the corresponding set of carriers based on a payload content, a scrambling sequence, or both.

In some examples of the method, apparatuses, and non-transitory computer-readable medium described herein, the MIB indicates system information common between the first set of carriers and the corresponding set of carriers.

In some examples of the method, apparatuses, and non-transitory computer-readable medium described herein, the MIB indicates scheduling information for carrier group-specific system information for the corresponding set of carriers.

Some examples of the method, apparatuses, and non-transitory computer-readable medium described herein may further include operations, features, means, or instructions for identifying a default configuration for group-specific system information for the corresponding set of carriers based on the MIB.

In some examples of the method, apparatuses, and non-transitory computer-readable medium described herein, the MIB may be received on a physical broadcast channel.

In some examples of the method, apparatuses, and non-transitory computer-readable medium described herein, the MIB indicates whether a carrier group-specific system information may be present for the corresponding set of carriers.

In some examples of the method, apparatuses, and non-transitory computer-readable medium described herein, the transmitting terminal may be a satellite of an NTN.

In some examples of the method, apparatuses, and non-transitory computer-readable medium described herein, receiving the configuration may include operations, features, means, or instructions for receiving synchronization information on the first carrier, where the synchronization information corresponds to one or more other carriers in one or more other beams including at least the second beam.

In some examples of the method, apparatuses, and non-transitory computer-readable medium described herein, the synchronization information may include a relative or absolute frequency synchronization parameter, a relative or absolute time synchronization parameter, a time-domain pre-compensation parameter, a frequency-domain pre-compensation parameter, information associated with an MIB, or any combination thereof.

Some examples of the method, apparatuses, and non-transitory computer-readable medium described herein may further include operations, features, means, or instructions for synchronizing to the one or more other carriers based on the synchronization information.

In some examples of the method, apparatuses, and non-transitory computer-readable medium described herein, the first beam, the second beam, the first carrier, the first set of synchronization signals, the second set of synchronization signals, the first set of carriers, the second set of carriers, or any combination thereof, may be used for narrowband internet of things communications.

A method of wireless communications at a transmitting terminal is described. The method may include transmitting, to a UE on a first carrier of a first set of carriers associated with a first beam of the base station, a configuration for the first set of carriers associated with a first beam and a second set of carriers associated with a second beam of the transmitting terminal, where the first carrier conveys a first set of synchronization signals and indicating at least a portion of a carrier group configuration for the second set of carriers based on the configuration.

An apparatus for wireless communications at a transmitting terminal is described. The apparatus may include a processor, memory coupled with the processor, and instructions stored in the memory. The instructions may be executable by the processor to cause the apparatus to transmit, to a UE on a first carrier of a first set of carriers associated with a first beam of the base station, a configuration for the first set of carriers associated with a first beam and a second set of carriers associated with a second beam of the transmitting terminal, where the first carrier conveys a first set of synchronization signals and indicate at least a portion of a carrier group configuration for the second set of carriers based on the configuration.

Another apparatus for wireless communications at a transmitting terminal is described. The apparatus may include means for transmitting, to a UE on a first carrier of a first set of carriers associated with a first beam of the base station, a configuration for the first set of carriers associated with a first beam and a second set of carriers associated with a second beam of the transmitting terminal, where the first carrier conveys a first set of synchronization signals and indicating at least a portion of a carrier group configuration for the second set of carriers based on the configuration.

A non-transitory computer-readable medium storing code for wireless communications at a transmitting terminal is described. The code may include instructions executable by a processor to transmit, to a UE on a first carrier of a first set of carriers associated with a first beam of the base station, a configuration for the first set of carriers associated with a first beam and a second set of carriers associated with a second beam of the transmitting terminal, where the first carrier conveys a first set of synchronization signals and indicate at least a portion of a carrier group configuration for the second set of carriers based on the configuration.

In some examples of the method, apparatuses, and non-transitory computer-readable medium described herein, a second carrier of the second set of carriers conveys a second set of synchronization signals.

In some examples of the method, apparatuses, and non-transitory computer-readable medium described herein, transmitting the configuration may include operations, features, means, or instructions for transmitting system information on the first carrier, where the system information corresponds to one or more carriers in one or more beams including at least the first and second beams.

In some examples of the method, apparatuses, and non-transitory computer-readable medium described herein, transmitting the configuration may include operations, features, means, or instructions for transmitting a cell configuration for a cell including at least the first set of carriers and the second set of carriers, where the cell configuration includes at least the configuration for the first set of carriers and the second set of carriers.

Some examples of the method, apparatuses, and non-transitory computer-readable medium described herein may further include operations, features, means, or instructions for transmitting a common system information on the first carrier for the cell, where the common system information may be applied for at least the first set of carriers and the second set of carriers.

Some examples of the method, apparatuses, and non-transitory computer-readable medium described herein may further include operations, features, means, or instructions for transmitting a second system information for the second set of carriers, where a first transmitted system information for the first set of carriers may be at least partially different from the second system information for the second set of carriers.

Some examples of the method, apparatuses, and non-transitory computer-readable medium described herein may further include operations, features, means, or instructions for transmitting an indication of at least one carrier frequency corresponding to at least one carrier in the second set of carriers.

In some examples of the method, apparatuses, and non-transitory computer-readable medium described herein, the indication of the carrier frequency includes a frequency shift value from the first set of carriers.

In some examples of the method, apparatuses, and non-transitory computer-readable medium described herein, a second carrier may be frequency shifted from the first carrier based on the frequency shift value, or where each carrier of the second set of carriers may be frequency shifted from corresponding carriers of the first set of carriers based on the frequency shift value.

In some examples of the method, apparatuses, and non-transitory computer-readable medium described herein, the indication of the carrier frequency includes one or more ARFCNs for at least one carrier in the second set of carriers.

In some examples of the method, apparatuses, and non-transitory computer-readable medium described herein, the configuration includes scheduling information for at least a portion of system information corresponding to the second set of carriers.

In some examples of the method, apparatuses, and non-transitory computer-readable medium described herein, transmitting the configuration may include operations, features, means, or instructions for transmitting a cell configuration on the first set of carriers for a second cell including at least the second set of carriers, where a first cell includes at least the first set of carriers.

In some examples of the method, apparatuses, and non-transitory computer-readable medium described herein, the cell configuration includes an indication of at least one carrier frequency corresponding to at least one carrier in the second set of carriers.

In some examples of the method, apparatuses, and non-transitory computer-readable medium described herein, the cell configuration for the second cell includes scheduling information for at least a portion of system information corresponding to the second cell.

In some examples of the method, apparatuses, and non-transitory computer-readable medium described herein, the cell configuration includes a set of cell configurations for a set of cells, where the set of cells includes at least the first cell and the second cell.

In some examples of the method, apparatuses, and non-transitory computer-readable medium described herein, the cell configuration includes system information that may be common for a set of cells.

Some examples of the method, apparatuses, and non-transitory computer-readable medium described herein may further include operations, features, means, or instructions for transmitting identifiers for one or more corresponding cells of the set of cells at least partially having common system information.

Some examples of the method, apparatuses, and non-transitory computer-readable medium described herein may further include operations, features, means, or instructions for indicating a first portion of common system information among carriers of the first cell and a second portion of common system information among a first one or more carriers of the first cell and a second one or more carriers of the second cell, where the first portion of common system information may be different from the second portion of common system information.

In some examples of the method, apparatuses, and non-transitory computer-readable medium described herein, transmitting the configuration may include operations, features, means, or instructions for transmitting an indication of one or more carriers of one or more sets of carriers, where each carrier of the one or more carriers conveys corresponding sets of synchronization signals, and where the one or more carriers may be indicated as candidate carriers corresponding to different beams for a beam reselection.

Some examples of the method, apparatuses, and non-transitory computer-readable medium described herein may further include operations, features, means, or instructions for transmitting a beam reselection indication to reselect the UE to one of the candidate carriers.

In some examples of the method, apparatuses, and non-transitory computer-readable medium described herein, the beam reselection indication may be transmitted via DCI, a MAC CE, or both.

In some examples of the method, apparatuses, and non-transitory computer-readable medium described herein, each candidate carrier belongs to a same cell as the first carrier or belongs to a different cell from the first carrier.

Some examples of the method, apparatuses, and non-transitory computer-readable medium described herein may further include operations, features, means, or instructions for reselecting the UE to a second carrier of the second set of carriers based on the configuration for the second set of carriers, and transmitting a second set of synchronization signals on the second carrier of the second set of carriers based on the configuration for the second set of carriers.

In some examples of the method, apparatuses, and non-transitory computer-readable medium described herein, transmitting the configuration may include operations, features, means, or instructions for transmitting an idle mode beam reselection configuration.

In some examples of the method, apparatuses, and non-transitory computer-readable medium described herein, the idle mode beam reselection configuration includes a first set of parameters for inter-cell reselection and a second set of parameters for intra-cell reselection, where the parameters include one or more of a threshold, an offset, or a hysteresis.

In some examples of the method, apparatuses, and non-transitory computer-readable medium described herein, the first set of carriers and the second set of carriers correspond to a first cell, or the first set of carriers corresponds to the first cell and the second set of carriers corresponds to a second cell.

Some examples of the method, apparatuses, and non-transitory computer-readable medium described herein may further include operations, features, means, or instructions for reselecting the UE to a second carrier of the second set of carriers while operating in an idle mode based on the idle mode beam reselection configuration.

In some examples of the method, apparatuses, and non-transitory computer-readable medium described herein, the idle mode beam reselection configuration includes a first set of parameters for inter-cell reselection among cells within a cell group and a second set of parameters for inter-cell reselection among cells across different cell groups, where the first set of parameters and the second set of parameters include one or more of a threshold, an offset, or a hysteresis.

In some examples of the method, apparatuses, and non-transitory computer-readable medium described herein, transmitting the configuration may include operations, features, means, or instructions for transmitting an MIB specific to a corresponding set of carriers.

In some examples of the method, apparatuses, and non-transitory computer-readable medium described herein, the MIB may be specific to the first set of carriers, the second set of carriers, or another set of carriers.

In some examples of the method, apparatuses, and non-transitory computer-readable medium described herein, the MIB may be specific to the corresponding set of carriers based on a payload content, a scrambling sequence, or both.

In some examples of the method, apparatuses, and non-transitory computer-readable medium described herein, the MIB indicates system information common between the first set of carriers and the corresponding set of carriers.

In some examples of the method, apparatuses, and non-transitory computer-readable medium described herein, the MIB indicates scheduling information for carrier group-specific system information for the corresponding set of carriers.

Some examples of the method, apparatuses, and non-transitory computer-readable medium described herein may further include operations, features, means, or instructions for indicating a default configuration for group-specific system information for the corresponding set of carriers based on the MIB.

In some examples of the method, apparatuses, and non-transitory computer-readable medium described herein, the MIB may be transmitted on a physical broadcast channel.

In some examples of the method, apparatuses, and non-transitory computer-readable medium described herein, the MIB indicates whether a carrier group-specific system information may be present for the corresponding set of carriers.

In some examples of the method, apparatuses, and non-transitory computer-readable medium described herein, transmitting the configuration may include operations, features, means, or instructions for transmitting synchronization information on the first carrier, where the synchronization information corresponds to one or more other carriers in one or more other beams including at least the second beam.

In some examples of the method, apparatuses, and non-transitory computer-readable medium described herein, the synchronization information may include a relative or absolute frequency synchronization parameter, a relative or absolute time synchronization parameter, a time-domain pre-compensation parameter, a frequency-domain pre-compensation parameter, information associated with an MIB, or any combination thereof.

Some examples of the method, apparatuses, and non-transitory computer-readable medium described herein may further include operations, features, means, or instructions for synchronizing the UE to the one or more other carriers based on the synchronization information.

In some examples of the method, apparatuses, and non-transitory computer-readable medium described herein, the transmitting terminal may be a satellite of an NTN.

In some examples of the method, apparatuses, and non-transitory computer-readable medium described herein, the first beam, the second beam, the first carrier, the first set of synchronization signals, the second set of synchronization signals, the first set of carriers, the second set of carriers, or any combination thereof, may be used for narrowband internet of things communications.

A method of wireless communications at a UE is described. The method may include receiving, on a first beam associated with a first cell of a transmitting terminal, a configuration for the first beam and a second beam associated with a second cell of a transmitting terminal, where the first beam conveys a first set of synchronization signals, and the second beam conveys a second set of synchronization signals and identifying at least a portion of a cell configuration associated with the second beam based on the configuration.

An apparatus for wireless communications at a UE is described. The apparatus may include a processor, memory coupled with the processor, and instructions stored in the memory. The instructions may be executable by the processor to cause the apparatus to receive, on a first beam associated with a first cell of a transmitting terminal, a configuration for the first beam and a second beam associated with a second cell of a transmitting terminal, where the first beam conveys a first set of synchronization signals, and the second beam conveys a second set of synchronization signals and identify at least a portion of a cell configuration associated with the second beam based on the configuration.

Another apparatus for wireless communications at a UE is described. The apparatus may include means for receiving, on a first beam associated with a first cell of a transmitting terminal, a configuration for the first beam and a second beam associated with a second cell of a transmitting terminal, where the first beam conveys a first set of synchronization signals, and the second beam conveys a second set of synchronization signals and identifying at least a portion of a cell configuration associated with the second beam based on the configuration.

A non-transitory computer-readable medium storing code for wireless communications at a UE is described. The code may include instructions executable by a processor to receive, on a first beam associated with a first cell of a transmitting terminal, a configuration for the first beam and a second beam associated with a second cell of a transmitting terminal, where the first beam conveys a first set of synchronization signals, and the second beam conveys a second set of synchronization signals and identify at least a portion of a cell configuration associated with the second beam based on the configuration.

Some examples of the method, apparatuses, and non-transitory computer-readable medium described herein may further include operations, features, means, or instructions for reselecting to the second beam based on the configuration for the second beam, and receiving the second set of synchronization signals on the second beam based on the configuration for the second beam.

In some examples of the method, apparatuses, and non-transitory computer-readable medium described herein, receiving the configuration may include operations, features, means, or instructions for receiving system information on the first beam, where the system information corresponds to one or more cells including at least the second cell.

In some examples of the method, apparatuses, and non-transitory computer-readable medium described herein, receiving the configuration may include operations, features, means, or instructions for receiving a common system information on the first cell, where the common system information may be applied for at least the first cell and the second cell.

In some examples of the method, apparatuses, and non-transitory computer-readable medium described herein, receiving the configuration may include operations, features, means, or instructions for receiving a second system information on the first cell for the second cell, where a first received system information for the first cell may be at least partially different from the second system information for the second cell.

In some examples of the method, apparatuses, and non-transitory computer-readable medium described herein, receiving the configuration may include operations, features, means, or instructions for receiving an indication of at least one carrier frequency corresponding to at least the second beam.

In some examples of the method, apparatuses, and non-transitory computer-readable medium described herein, the configuration includes scheduling information for at least a portion of system information associated with the second beam.

In some examples of the method, apparatuses, and non-transitory computer-readable medium described herein, receiving the configuration may include operations, features, means, or instructions for receiving an idle mode beam reselection configuration, where the UE reselects to the second beam based on the idle mode beam reselection configuration.

In some examples of the method, apparatuses, and non-transitory computer-readable medium described herein, the transmitting terminal may be a satellite of an NTN.

In some examples of the method, apparatuses, and non-transitory computer-readable medium described herein, the first beam, the second beam, the first cell, the second cell, the first set of synchronization signals, the second set of synchronization signals, or any combination thereof, may be used for narrowband internet of things communications.

A method of wireless communications at a transmitting terminal is described. The method may include transmitting, on a first beam associated with a first cell of the transmitting terminal, a configuration for the first beam and a second beam associated with a second cell of the transmitting terminal, where the first beam conveys a first set of synchronization signals, and the second beam conveys a second set of synchronization signals and indicating at least a portion of a cell configuration associated with the second beam based on the configuration.

An apparatus for wireless communications at a transmitting terminal is described. The apparatus may include a processor, memory coupled with the processor, and instructions stored in the memory. The instructions may be executable by the processor to cause the apparatus to transmit, on a first beam associated with a first cell of the transmitting terminal, a configuration for the first beam and a second beam associated with a second cell of the transmitting terminal, where the first beam conveys a first set of synchronization signals, and the second beam conveys a second set of synchronization signals and indicate at least a portion of a cell configuration associated with the second beam based on the configuration.

Another apparatus for wireless communications at a transmitting terminal is described. The apparatus may include means for transmitting, on a first beam associated with a first cell of the transmitting terminal, a configuration for the first beam and a second beam associated with a second cell of the transmitting terminal, where the first beam conveys a first set of synchronization signals, and the second beam conveys a second set of synchronization signals and indicating at least a portion of a cell configuration associated with the second beam based on the configuration.

A non-transitory computer-readable medium storing code for wireless communications at a transmitting terminal is described. The code may include instructions executable by a processor to transmit, on a first beam associated with a first cell of the transmitting terminal, a configuration for the first beam and a second beam associated with a second cell of the transmitting terminal, where the first beam conveys a first set of synchronization signals, and the second beam conveys a second set of synchronization signals and indicate at least a portion of a cell configuration associated with the second beam based on the configuration.

In some examples of the method, apparatuses, and non-transitory computer-readable medium described herein, transmitting the configuration may include operations, features, means, or instructions for reselecting the UE to the second beam based on the configuration, and transmitting the second set of synchronization signals on the second beam based on the configuration for the second beam.

In some examples of the method, apparatuses, and non-transitory computer-readable medium described herein, transmitting the configuration may include operations, features, means, or instructions for transmitting system information on the first beam, where the system information corresponds to one or more cells including at least the second cell.

In some examples of the method, apparatuses, and non-transitory computer-readable medium described herein, transmitting the configuration may include operations, features, means, or instructions for transmitting a common system information on the first cell, where the common system information may be applied for at least the first cell and the second cell.

In some examples of the method, apparatuses, and non-transitory computer-readable medium described herein, transmitting the configuration may include operations, features, means, or instructions for transmitting a second system information on the first cell for the second cell, where a first transmitted system information for the first cell may be at least partially different from the second system information for the second cell.

In some examples of the method, apparatuses, and non-transitory computer-readable medium described herein, transmitting the configuration may include operations, features, means, or instructions for transmitting an indication of at least one carrier frequency corresponding to at least the second beam.

In some examples of the method, apparatuses, and non-transitory computer-readable medium described herein, the configuration includes scheduling information for at least a portion of system information associated with the second beam.

Some examples of the method, apparatuses, and non-transitory computer-readable medium described herein may further include operations, features, means, or instructions for transmitting an idle mode beam reselection configuration, where the UE reselects to the second beam based on the idle mode beam reselection configuration.

In some examples of the method, apparatuses, and non-transitory computer-readable medium described herein, the transmitting terminal may be a satellite of an NTN.

In some examples of the method, apparatuses, and non-transitory computer-readable medium described herein, the first beam, the second beam, the first cell, the second cell, the first set of synchronization signals, the second set of synchronization signals, or any combination thereof, may be used for narrowband internet of things communications.

DETAILED DESCRIPTION

Figure 1:
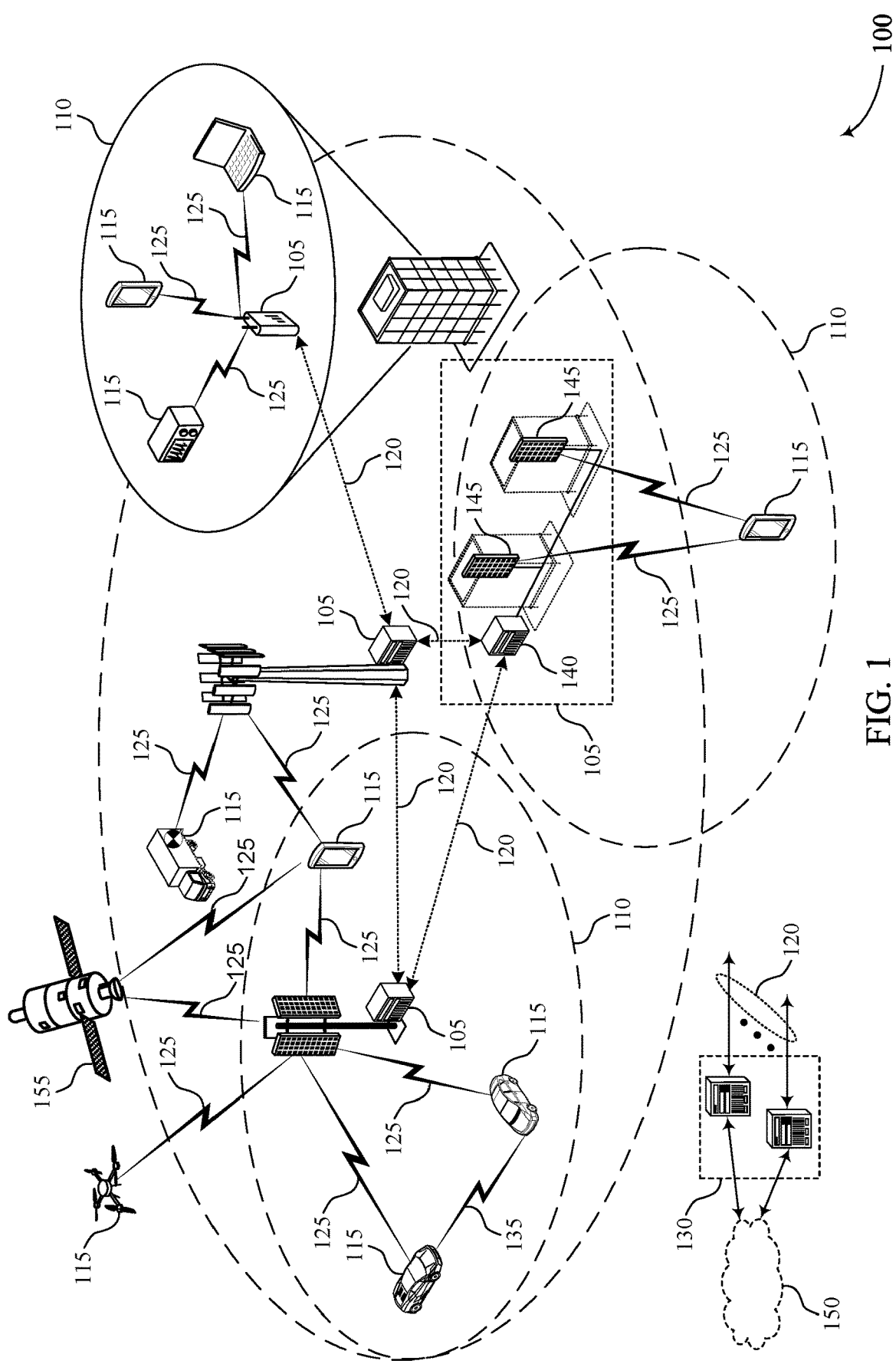
FIG. 1 illustrates an example of a system for wireless communications that supports beam reselection for narrowband non-terrestrial networks (NTNs) in accordance with aspects of the present disclosure.

Non-terrestrial networks (NTNs) may provide coverage to a geographic area by using one or more high-altitude devices (for example, satellites) in communication with one or more user terminals or one or more base stations (for example, next-generation NodeBs or giga-NodeBs (either of which may be referred to as a gNB)) (also referred to as access stations or access gateways)), or both one or more user terminals and one or more base stations. A high-altitude device may also be referred to as a satellite herein and a terrestrial base station may also be referred to as a base station herein.

In some examples, a base station may transmit data to a satellite which may then be transmitted to a user terminal, or the base station may transmit data to a user terminal which may then be transmitted to a satellite. Alternatively, a user terminal may communicate with a satellite indirectly through a terrestrial base station. In some examples, a satellite itself may be or include functionality of a base station. In such examples, the satellite and the user terminal may communicate directly. Examples of a user terminal may include a user equipment (UE), or a relay equipment configured to relay a signal between a satellite and a user terminal, or other devices. In some cases, an NTN may support narrowband internet of things (IoT) communications.

A satellite may provide multiple beams. In some examples, different satellite beams belonging to the same satellite may use different frequencies. The satellite may move, for example in low earth orbit (LEO), which may affect channel conditions for the UE on the different beams. For example, the UE may perform cell reselection to improve communication conditions as the satellite moves and changes the channel conditions for the beams. However, performing frequent cell reselection may increase power consumption at the UE, as the UE may perform measurements and read system information when the UE performs the cell reselection.

By implementing techniques described herein, a UE may move, or reselect, among beams of a satellite without performing a full system information read. In some cases, the UE may move, or reselect, among beams of the satellite with a simplified synchronization procedure. For example, the UE may reselect to a different beam without re-obtaining all of the system information or without reading all of the synchronization signals, or both, thereby reducing the power consumption at the UE. When a UE accesses a beam, the UE may obtain system information on the beam. In some cases, the UE may receive a configuration indicating system information for other beams. For example, the UE may identify system information which is common between a currently selected beam and other beams of the satellite, or the UE may be indicated frequency information for the other beams.

In some cases, each beam of the satellite may include one or more carriers. For example, each beam of a satellite may include at least one carrier which carries synchronization signals, system information, or both. In some cases, a carrier with synchronization signals, system information, or both, may be referred to as an anchor carrier. In some cases, the beam may include additional carriers, which may be used for communications. The satellite may provide one or more cells, where each cell may include one or more sets of carriers. Each set of carriers may correspond to a different beam of the satellite. When the UE accesses an anchor carrier and reads system information on the anchor carrier, the UE may be able to obtain information about other (e.g., neighboring) beams or sets of carriers. In some cases, the UE may obtain information about other beams, or sets of carriers, within the same cell. For example, the UE may identify common system information, which may be used across multiple beams or sets of carriers within the same cell. Additionally, or alternatively, the UE may identify system information which is specific to another set of carriers. In some cases, the UE may identify scheduling information for system information blocks (SIBs) which are specific to a set of carriers. In some cases, the UE may identify carrier frequency information for another set of carriers or beam. In some additional, or alternative, examples, the UE may obtain information about beams, or sets of carriers, in different cells. For example, the UE may identify system information that is common with carrier groups in different cells or identify anchor carrier frequencies for different sets of carriers in other cells. In some cases, each beam may correspond to a different cell, and the UE may similarly be indicated common system information or cell-specific system information for other cells.

The UE may reselect from a first set of carriers to a second set of carriers based on the system information received on the anchor carrier of the first set of carriers. The UE may already have some system information or synchronization information for the second set of carriers, so the UE may not perform a full system information read to make the reselection. In some cases, the UE may be configured to switch, or reselect, beams based on an indication, in a connected mode of operation, over downlink control information (DCI) or a medium access control (MAC) control element (CE). In some cases, the UE may be configured with parameters for an idle mode beam or cell reselection, and the UE may perform an idle mode reselection based on the parameters. The beam reselection may be inter-cell (e.g., between carriers, or sets of carriers, of different cells) or intra-cell (e.g., between carriers, or sets of carriers, of a cell).

Aspects of the disclosure are initially described in the context of wireless communications systems. Aspects of the disclosure are further illustrated by and described with reference to apparatus diagrams, system diagrams, and flowcharts that relate to beam reselection for narrowband non-terrestrial networks.

FIG. 1 illustrates an example of a wireless communications system 100 that supports beam reselection for narrowband non-terrestrial networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. In some cases, such as in narrowband Internet of Things (IoT), a carrier may refer to a narrowband resource block of 180 kHz bandwidth. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The wireless communications system 100 also includes at least one satellite 155. The satellite 155 may communicate with one or more of the base stations 105 and the user terminals 115 (such as UEs). The satellite 155 may be any suitable type of communication satellite configured to facilitate communications between different nodes in a wireless communication system, such as an NTN. The satellite 155 may be an example of a space satellite, a balloon, a dirigible, an airplane, a drone, or an unmanned aerial vehicle, among other examples. In some examples, the satellite 155 may be or include a geosynchronous or geostationary earth orbit (GEO) satellite, a LEO satellite or a medium earth orbit (MEO) satellite, or a high-altitude platform (HAP), among other examples. In some examples, the satellite 155 may be a multi-beam satellite configured to provide service for multiple service beam coverage areas in a defined geographical service area.

In some examples, a cell may be provided or established by a satellite 155 as part of an NTN. A satellite 155 may, in some examples, perform the functions of a base station 105. For example, the satellite 155 may directly communicate with the core network 130 without utilizing a terrestrial base station (for example, the base station 105), may directly communicate with one or more devices, such as one or more user terminals 115, or both. In some other examples, the satellite 155 may be an example of a relay transponder for a base station 105.

The wireless communications system 100 may support efficient beam reselection for a UE 115 communicating with a satellite 155 without the UE 115 re-obtaining all of the system information, reducing the power consumption at the UE 115. When a UE 115 accesses a beam, the UE 115 may obtain system information on the beam. In some cases, the UE 115 may receive a configuration indicating system information for other beams. For example, the UE 115 may identify system information which is common between a currently selected beam and other beams of the satellite 155, or the UE 115 may be indicated frequency information for the other beams.

In some cases, each beam of the satellite 155 may include one or more carriers. In some examples, carriers may be narrowband carriers including one resource block of 180 kHz for narrowband IoT communications. For example, each beam of a satellite 155 may include at least one carrier (e.g., an anchor carrier) which carries synchronization signals, system information, or both. The satellite 155 may provide one or more cells, where each cell may include one or more sets of carriers. Each set of carriers may correspond to a different beam of the satellite 155. When the UE 115 accesses an anchor carrier and reads system information on the anchor carrier, the UE 115 may be able to obtain information about other (e.g., neighboring) beams or sets of carriers. In some cases, the UE 115 may obtain information about other beams, or sets of carriers, within the same cell. Additionally, or alternatively, the UE 115 may identify system information which is specific to another set of carriers. In some additional, or alternative, examples, the UE 115 may obtain information about beams, or sets of carriers, in different cells. For example, the UE 115 may identify system information that is common with carrier groups in different cells or identify anchor carrier frequencies for different sets of carriers in other cells.

The UE 115 may reselect from a first set of carriers to a second set of carriers based on the system information received on the anchor carrier of the first set of carriers. The UE 115 may already have some system information or synchronization information for the second set of carriers, so the UE 115 may not perform a full system information read or may perform a quicker synchronization procedure to make the reselection. In some cases, the UE 115 may be configured to switch, or reselect, beams based on an indication over DCI or a MAC CE. In some cases, the UE may be configured with parameters for an idle mode beam or cell reselection, and the UE may perform an idle mode reselection based on the parameters. The beam reselection may be inter-cell or intra-cell (e.g., between carriers, or sets of carriers, of a cell).

Figure 2:
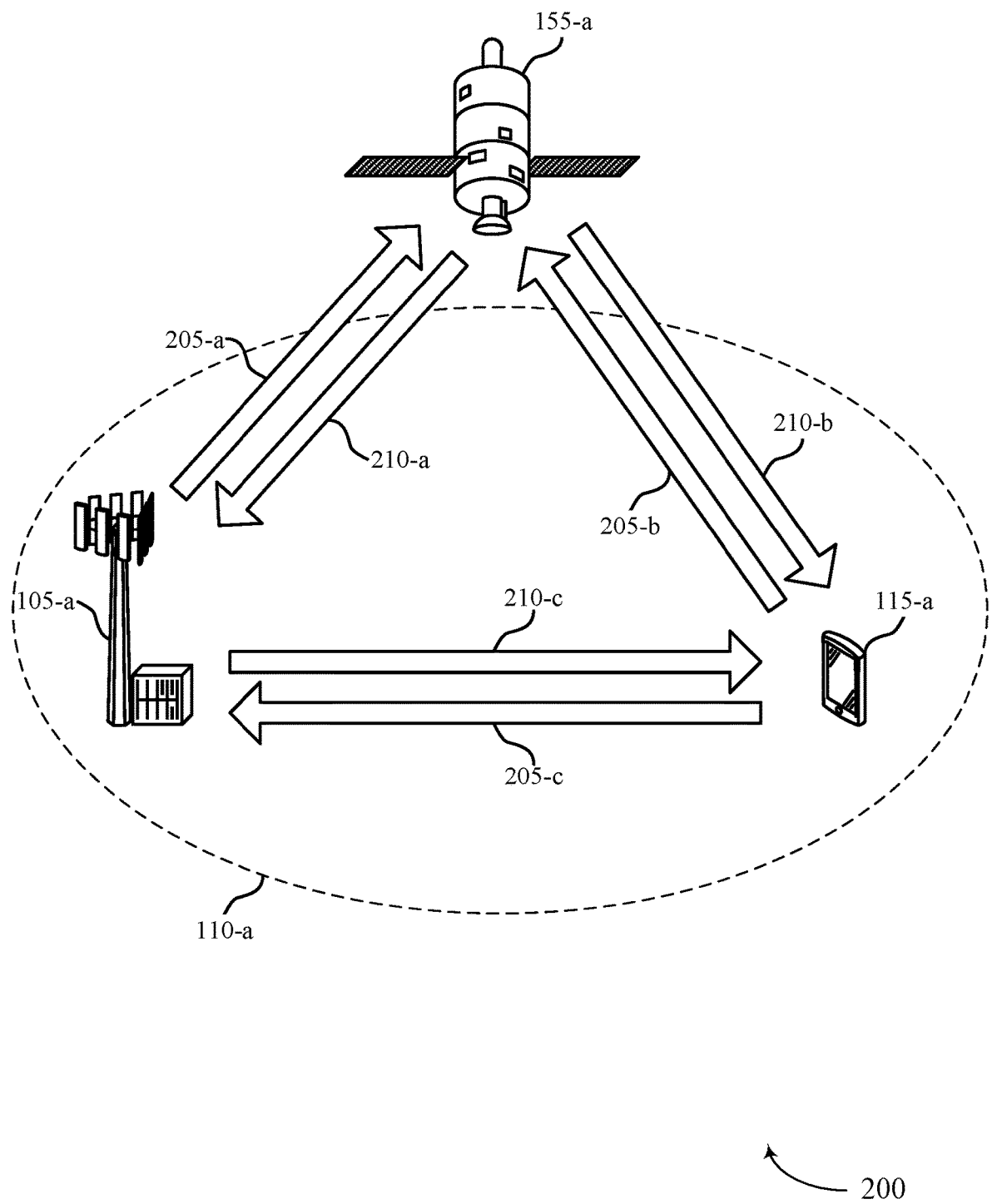
FIG. 2 illustrates an example of a wireless communications system that supports beam reselection for narrowband NTNs in accordance with aspects of the present disclosure.

FIG. 2 illustrates an example of a wireless communications system 200 that supports beam reselection for narrowband non-terrestrial networks in accordance with aspects of the present disclosure. In some examples, wireless communications system 200 may implement aspects of wireless communications system 100. For example, the wireless communications system 200 may include a base station 105-a, a UE 115-a, and a satellite 155-a, which may be examples of a base station 105, a UE 115, and a satellite 155, as described with reference to FIG. 1.

The wireless communications system 200 may provide a geographic coverage area 110-a by using a satellite 155-a in communication with one or more of a base station 105-a and a UE 115-a. The base station 105-a may therefore serve a geographic coverage area 110-a with assistance of, or through, the satellite 155-a. In some examples, the base station 105-a may not have its own ground geographic coverage area. For example, the base station 105-a may communicate directly with the satellite 155-a without directly communicating to any ground user terminals, for example, the UE 115-a. In some examples, the satellite 155-a may relay communications between the base station 105-a to the UE 115-a. For example, the UE 115-a may communicate with the satellite 155-a via the base station 105-a or vice-versa. In some examples, a ground or terrestrial base station (for example, the base station 105-a) may be a gateway. In some such examples, the satellite 155-a can itself function as a base station (in other words, can perform scheduling and RLC, among other operations). An NTN may not, in some examples, include base stations 105-a that directly communicate with the UE 115-a without relaying communications through a satellite 155-a. In some other examples, an NTN may be formed of satellites 155-a and may not include any base stations 105.

In some examples, the UE 115-a and the satellite 155-a may communicate directly via the uplink 205-b and the downlink 210-b. Additionally or alternatively, the UE 115-a and the satellite 155-a may communicate indirectly through the base station 105-a via the uplink 205-a and the downlink 210-a between the base station 105-a and the satellite 155-a as well as via the uplink 205-c and the downlink 210-c between the base station 105-a and the UE 115-a. In some examples, for communications originating at the UE 115-a and destined for the base station 105-a, the UE 115-a may transmit an uplink transmission on the uplink 205-b to the satellite 155-a. The satellite 155-a may relay the uplink transmission on the uplink 205-b as a downlink transmission on the downlink 210-a to the base station 105-b.

The satellite 155-a may provide multiple beams. In some examples, different satellite beams belonging to the satellite 155-a may use different frequencies. The satellite 155-a may move, for example in LEO, which may affect channel conditions for the UE 115-a on the different beams. For example, the UE 115-a may perform cell reselection as the satellite 155-a moves to improve communication conditions. However, performing frequency cell reselection may increase power consumption at the UE 115-a, as the UE 115-a may read system information when the UE 115-a performs the cell reselection.

By implementing techniques described herein, a UE 115 may move, or reselect, among beams of a satellite without performing a full system information read. For example, the UE 115-a may reselect to a different beam without re-obtaining all of the system information, reducing the power consumption at the UE 115-a. When the UE 115-a accesses a beam, the UE 115-a may obtain system information on the beam. In some cases, the UE 115-a may receive a configuration indicating system information for other beams. For example, the UE 115-a may identify system information which is common between a currently selected beam and other beams of the satellite, or the UE 115-a may be indicated frequency information for the other beams.

In some cases, each beam of the satellite 155-a may include one or more carriers. For example, each beam of a satellite 155-a may include at least one carrier which carries synchronization signals, system information, or both. In some cases, a carrier with synchronization signals, system information, or both, may be referred to as an anchor carrier. In some cases, the beam may include additional carriers (e.g., in addition to the anchor carrier), which may be used for communications. The satellite 155-a may provide one or more cells, where each cell may include one or more sets of carriers. Each set of carriers may correspond to a different beam of the satellite 155-a. An example configuration of multiple carriers and multiple sets of carriers for a cell is described in more detail with reference to FIG. 3.

When the UE 115-a accesses an anchor carrier and reads system information on the anchor carrier, the UE 115-a may be able to obtain information about other (e.g., neighboring) beams or sets of carriers. Obtaining information for the other beams may improve the efficiency of performing a beam switch or beam reselection. For example, the UE 115-a may receive less system information in order to have a complete beam configuration for the target beam, or both.

In some cases, the UE 115-a may obtain information about other beams, or sets of carriers, within the same cell. For example, the UE may identify common system information, which may be used across multiple beams or sets of carriers within the same cell. For example, the UE 115-a may determine that at least a portion of system information acquired by the UE 115-a for the current anchor carrier is valid across other beams or carrier groups in the same cell. In some cases, the configuration of carriers within a carrier group (e.g., indicated by one or more SIBs) may be carrier-group specific, while the configuration of anchor carriers in different carrier groups (e.g., indicated by one or more other SIBs) may be common). In some cases, the common system information may include at least a configuration for the UE 115-a to receive paging in another carrier group without having to read SIBs in that carrier group. In some cases, UE 115-a may receive a set of identifiers for beams or sets of carriers which share at least a portion of system information.

In some examples, the UE 115-a may identify carrier group-specific system information. For example, UE 115-a may identify scheduling information for one or more SIBs which are specific to another set of carriers. In some cases, the scheduling information may enable the UE 115-a to skip decoding one or more SIBs (e.g., SIB1) of a new carrier group to obtain group-specific SIB scheduling information.

In some cases, the UE 115-a may identify frequency information for the other sets of carriers. For example, the system information on the anchor carrier may indicate a carrier frequency for different beams, sets of carriers, or anchor carriers, in the same cell. In some cases, the satellite 155-*a* may indicate an explicit indication of the carrier frequencies, such as by indicating an absolute radio frequency channel number (ARFCN) of another carrier frequency. In some cases, the ARFCN may indicate an anchor carrier frequency, one or more non-anchor carrier frequencies, or any combination thereof. In some cases, the satellite 155-*a* may indicate a frequency shift, or a frequency difference, for sets of carriers which are frequency shifts of the current set of carriers. For example, in some cases, the anchor in a second set of carriers may be indicated as a shift. In some cases, each carrier in a second set of carriers may be derivable from a first set of carriers by a frequency shift. For example, a second configuration for a second beam may be a frequency shifted version of a first configuration for a first beam.

In some cases, the UE 115-*a* may obtain information for beams or sets of carriers in other cells. For example, the UE 115-*a* may obtain information for multiple beams in different cells. In some cases, the UE 115-*a* may obtain anchor carrier frequencies of different sets of carriers in the cells. In some cases, the UE 115-*a* may identify system information that is common with sets of carriers in the difference cells. For example, some portion of system information may be skipped by the UE 115-*a* if the UE 115-*a* switches to a beam of another cell. In some cases, the commonality between system information of carrier groups in different cells may be different from the commonality between system information of carrier groups in the same cell. In some cases, the UE 115-*a* may obtain information for scheduling information for carrier group-specific SIBs for different cells.

In some cases, the UE 115-*a* may receive a master information block (MIB) from the satellite 155-*a*, which may indicate some information specific to a carrier group. For example, UE 115-*a* may have reselected to a carrier of a second set of carriers (e.g., associated with a second beam) from a first set of carriers (e.g., associated with a first beam). UE 115-*a* may receive a MIB which is associated with the second set of carriers. The MIB may include an indication of whether the second set of carriers has any common system information with the first set of carriers. In some cases, the MIB may indicate which system information is common between the sets of carriers. In some cases, if a carrier group-specific SIB is present, scheduling information for the carrier group-specific SIBs may be included in the MIB. In some cases, if a carrier group-specific SIB is absent, the UE 115-*a* may assume a common, or default, configuration for the group-specific SIB components. In some cases, the common, or default, configuration may be signaled, at least partially, in SIBs transmitted on the anchor carriers of different sets of carriers. In some examples, the MIB may be a narrowband MIB and transmitted on a narrowband physical broadcast channel. A narrowband MIB may be specific to a carrier group based on a content of a payload of the narrowband MIB or based on a scrambling applied to the payload.

The UE may reselect from a first set of carriers to a second set of carriers based on the system information received on the anchor carrier of the first set of carriers. For example, the UE 115-*a* may be indicated one or more anchor carriers in the same cell or in different cells. The UE 115-*a* may be configured to switch, or reselect, beams based on an indication over DCI or a MAC CE. In some cases, the UE 115-*a* may be configured to switch between beams for which the UE 115-*a* has received at least information. For example, if the UE 115-*a* has been indicated a carrier frequency, common system information, or carrier group-specific system information for a set of carriers, the UE 115-*a* may be able to perform an efficient beam switch to the set of carriers. In some cases, the UE 115-*a* may perform inter-cell beam switches (e.g., to sets of carriers in different cells) or intra-cell beam switches (e.g., to sets of carriers in the same cell).

In some cases, the UE 115-*a* may be configured with parameters for an idle mode beam or cell reselection. For example, the UE 115-*a* may be configured with offsets, thresholds, hysteresis, etc., for an idle mode reselection. The parameters for intra-cell reselection may be different from parameters for inter-cell reselection. For example, the thresholds and hysteresis values may be larger for inter-cell reselection than intra-cell reselection. The UE 115-*a* may perform an idle mode reselection based on the parameters. The beam reselection may be inter-cell or intra-cell (e.g., between carriers, or sets of carriers, of a cell).

In some cases, each beam may correspond to a different cell, and the UE may similarly be indicated common system information or cell-specific system information for other cells. For example, system information may be common across multiple cells, so that after cell reselection, the UE 115-*a* may not read all of the SIBs in order to be paged or communicate on the new cell. In some cases, SIB signaling may indicate which cells share the same system information, or which cells at least partially share system information. In some cases, the UE 115-*a* may be configured with cell groups, where different cells may have different cell reselection criterion. For example, the UE 115-*a* may have a lower threshold to reselect to a cell in the same cell group.

In some examples, a UE 115 that is camped on a set of carriers may receive paging or perform random access within the carriers of the set of carriers. In some examples, the UE, which may be operating in an idle mode, may receive paging or perform random access within the carriers of the set of carriers. In some cases, the UE 115 may be able to perform idle mode satellite beam reselection (e.g., within the same cell) in addition to cell reselection. In some cases, the idle mode satellite beam reselection may be based on parameters, thresholds, or hysteresis configured via system information.

Figure 3:
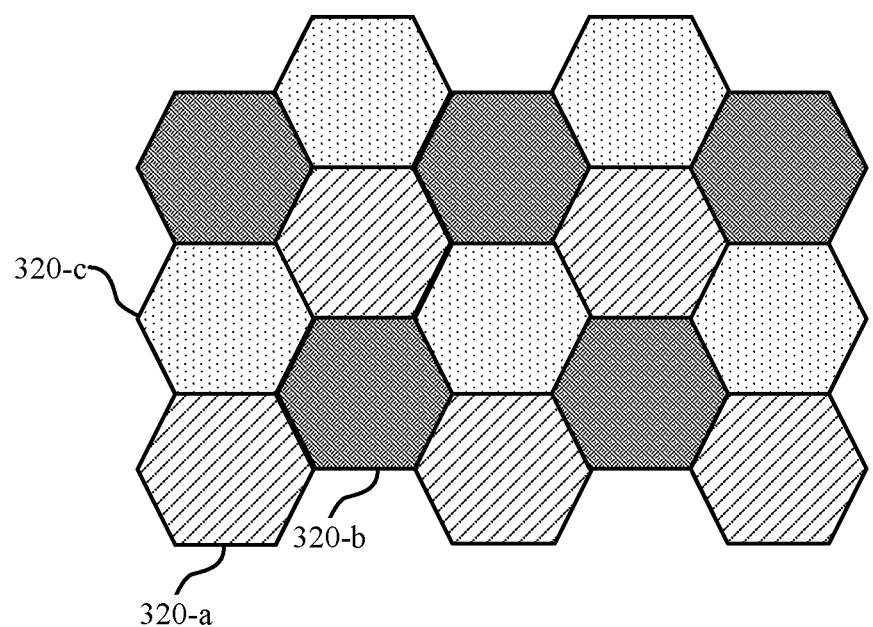
FIG. 3 illustrates an example of a satellite beam configuration that supports beam reselection for narrowband NTNs in accordance with aspects of the present disclosure.
Figure 3:
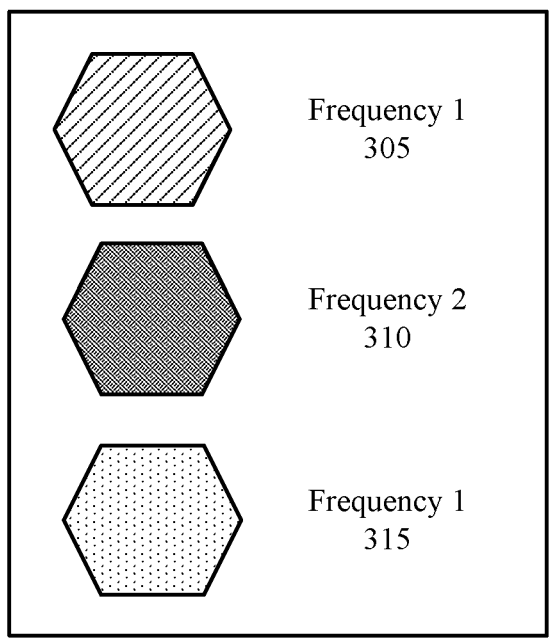

FIG. 3 illustrates an example of a satellite beam configuration 300 that supports beam reselection for narrowband non-terrestrial networks in accordance with aspects of the present disclosure. In some examples, the satellite beam configuration 300 may implement aspects of wireless communications system 100.

A satellite may provide multiple beams for communications with a UE 115. In some cases, different satellite beams of a satellite may have different frequencies. For example, the satellite may transmit on beams at multiple frequencies, such a first frequency 305, a second frequency 310, and a third frequency 315. A coverage area 320 may be associated with a beam of the satellite. For example, coverage area 320-*a* may be associated with a beam that uses the first frequency 305, coverage area 320-*b* may be associated with a beam that uses the second frequency 310, and coverage area 320-*c* may be associated with a beam that uses the third frequency 315. In some other examples, additional frequencies may be used by beams of the satellite.

In some cases, a coverage area 320 may be associated with a geographical area, similar to a coverage area 110 as described with reference to FIG. 1. As a UE 115 moves, or as the satellite moves (e.g., in LEO), the UE 115 may move between coverage areas or have better communications conditions with different beams. UEs 115 may implement techniques described herein to improve the efficiency of beam reselection, for example by reducing an amount of system information read by the UE upon reselecting.

In an example, the satellite may be configured with one or more sets of carriers. Each set of carriers may be associated with a different beam. For example, a first beam for coverage area 320-*a* may provide a first set of carriers, a second beam for coverage area 320-*b* may provide a second set of carriers, and a third beam for coverage area 320-*b* may provide a third set of carriers. In some examples, each set of carriers may include at least one carrier which is used to send synchronization signals and system information. In some cases, a carrier which is used to send synchronization signals and system information may be referred to as an anchor carrier.

In some cases, the satellite may provide one or more cells. For example, a first cell may include the first set of carriers associated with coverage area 320-*a* and the first beam, the second set of carriers associated with coverage area 320-*b* and the second beam, and the third set of carriers associated with coverage area 320-*c* and the second beam. In some cases, a cell may include additional, or fewer, beams or sets of carriers.

A UE 115 may connect to a carrier of a set of carriers, and the UE 115 may receive system information on the carrier. In some cases, the UE 115 may obtain system information for other sets of carriers. In some cases, the indication of configurations or system information for other sets of carriers may be indicated by system information, such as in one or more SIBs or in a MIB. For example, the UE 115 may identify system information that is at least partially common between other sets of carriers in a same cell. In some cases, the UE 115 may be connected to the first set of carriers, and the UE 115 may be indicated what, if any, system information for the first set of carriers is also applicable to the second and third sets of carriers. In some cases, the UE 115 may be indicated frequency information for other sets of carriers. In some examples, the UE 115 may also be indicated system information, or partial system information, for other sets of carriers in different cells.

In some cases, each beam of the satellite may correspond to a cell. For example, each coverage area 320 may correspond to a cell and a beam. The UE 115 may connect to a cell and similarly obtain system information for other cells in order to make efficient cell reselection.

Figure 4:
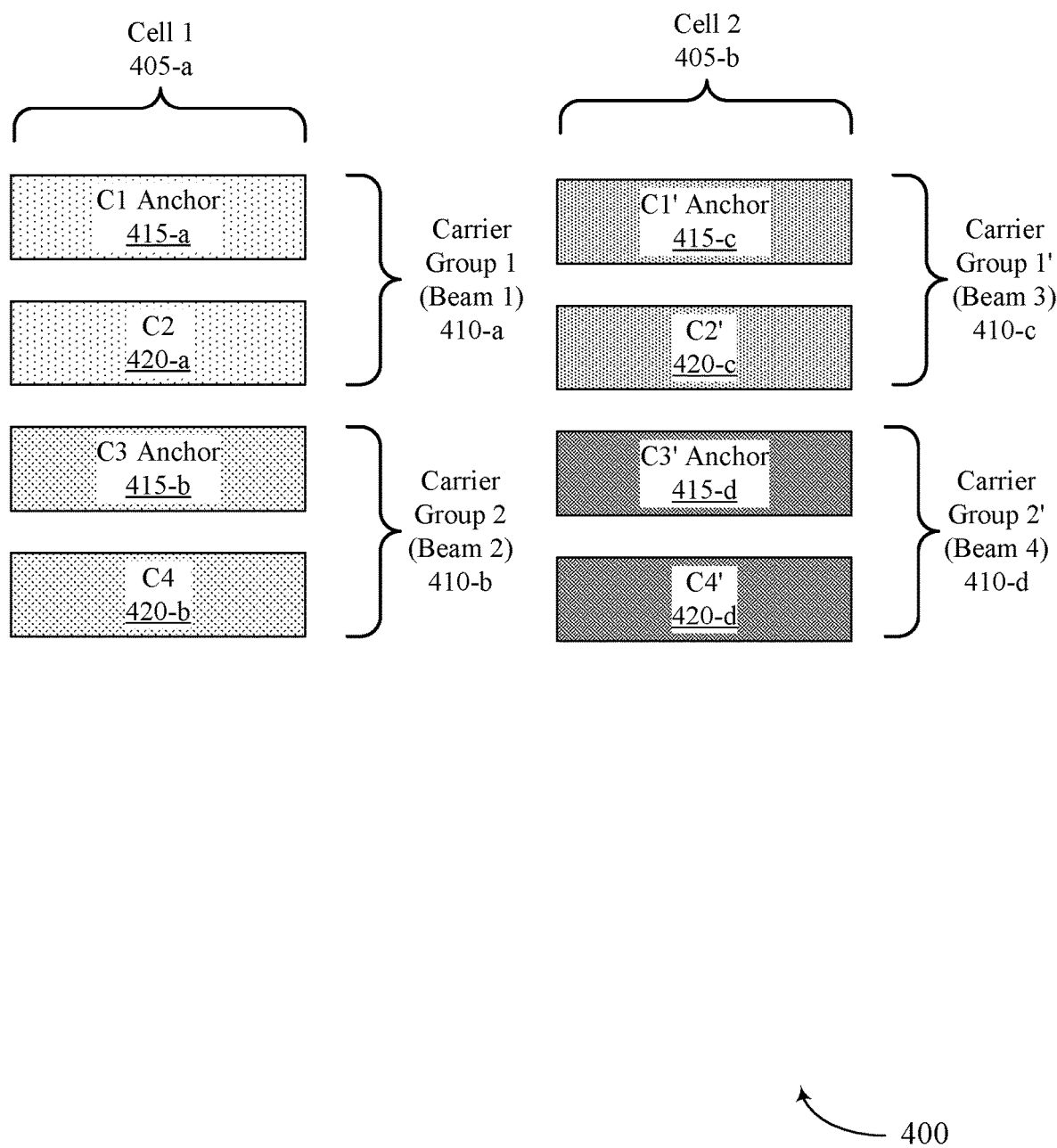
FIG. 4 illustrates an example of a cell configuration that supports beam reselection for narrowband NTNs in accordance with aspects of the present disclosure.

FIG. 4 illustrates an example of a cell configuration 400 that supports beam reselection for narrowband non-terrestrial networks in accordance with aspects of the present disclosure. In some examples, the cell configuration 400 may implement aspects of wireless communications system 100.

A satellite may provide one or more beams for a UE 115. In some cases, each satellite beam may correspond to one or more carriers. A narrowband IoT carrier may be an example of one of the carriers provided by the satellite.

For example, the satellite may provide one or more cells 405, where each cell may include one or more sets of carriers 410. Cell 405-*a* may include set of carriers 410-*a* and set of carriers 410-*b*, and cell 405-*b* may include set of carriers 410-*c* and set of carriers 410-*d*. Set of carriers 410-*a* may include carriers including at least anchor carrier 415-*a* and carrier 420-*a*. Set of carriers 410-*b* may include anchor carrier 415-*b* and carrier 420-*b*. Set of carriers 410-*c* of cell 405-*b* may include anchor carrier 415-*c* and carrier 420-*c*, and set of carriers 410-*d* may include anchor carrier 415-*d* and carrier 420-*d*. In other examples, a set of carriers may include a different number of carriers, or a cell 405 may include a different number of sets of carriers 410. In some cases, a set of carriers 410 may be referred to as a carrier group.

In some cases, at least one of the carriers in each beam may be used to send synchronization signals, system information, or both. For example, an anchor carrier 415 of a set of carriers 410 may be used to send synchronization signals and system information. In some cases, other carriers (e.g., a carrier 420) of the set of carriers 410 may be used for communications and may not be used to send synchronization signals and system information. A set of carriers 410 may, in some cases, include at least one anchor carrier 415 and zero or more carriers 420. In some cases, a set of carriers 410 may not include an anchor carrier 415 but include one or more carriers 420. For example, a set of carriers 410 without an anchor carrier 415 use common system information with another set of carriers 410.

In an example, a UE 115 may access anchor carrier 415-*a* and receive system information on anchor carrier 415-*a*. For example, the UE 115 may receive system information relating to the first set of carriers 410-*a*. In some cases, the UE 115 may receive an indication of system information on other sets of carriers 410 or other cells 405. In some cases, the UE 115 may receive system information including indications of configurations or system information for other beams or sets of carriers 410.

For example, the UE 115 may identify system information for set of carriers 410-*b*. In some cases, the UE 115 may identify that some system information for the first set of carriers 410-*a* may be valid across other beams or sets of carriers 410, such as set of carriers 410-*b*. For example, some system information conveyed by SIBs may be the same for set of carriers 410-*a* and set of carriers 410-*b*. In some cases, the UE 115 may be indicated frequency information for other beams. For example, the UE 115 may be indicated a carrier frequency for carriers in the set of carriers 410-*b*, such as anchor carrier 415-*b*. In some cases, the UE 115 may be explicitly indicated the carrier frequency for set of carriers 410-*b*, or the UE 115 may receive an indication of a frequency shift from set of carriers 410-*a*. In some cases, the UE 115 may be indicated scheduling information for SIBs associated with the other sets of carriers 410.

Additionally, or alternatively, the UE 115 may identify system information for sets of carriers 410 in cell 405-*b*, such as set of carriers 410-*c* and set of carriers 410-*d*. In some cases, the UE 115 may be indicated anchor carrier frequencies for different carrier groups in different cells 405, including at least cell 405-*b*. In some cases, the UE 115 may be indicated which, if any, system information is common across cell 405-*a* and cell 405-*b*. In some cases, there may be more common system information between sets of carriers 410 of a cell than between cells 405. In some examples, the UE 115 may identify scheduling information for SIBs of the different cells 405.

In some cases, the UE 115 may be indicated a set of anchor carriers 415, among which the UE 115 may perform a beam reselection. In some cases, the beam reselection may be initiated based on DCI or a MAC CE. In some cases, the set of anchor carriers 415 may be in a same cell 405 or across different cells 405. For example, if the UE 115 is on anchor carrier 415-*a*, the UE 115 may be configured with anchor carrier 415-*b* and anchor carrier 415-*c*, and the UE 115 may perform a beam reselection to either of the anchor carriers. In some cases, the UE 115 may be configured with at least partial system information for the beams or sets of carriers 410.

In some cases, the UE 115 may be configured with parameters for a beam reselection via system information. For example, the UE 115 may be configured with offsets, thresholds, and hysteresis for performing a beam reselection. In some cases, the UE 115 may be configured for an idle mode beam reselection, where the UE 115 performs the beam reselection while operating in an idle mode. In some cases, the UE 115 may be configured with different parameters, thresholds, or hysteresis for intra-cell carrier group reselection and inter-cell carrier group reselection.

Figure 5:
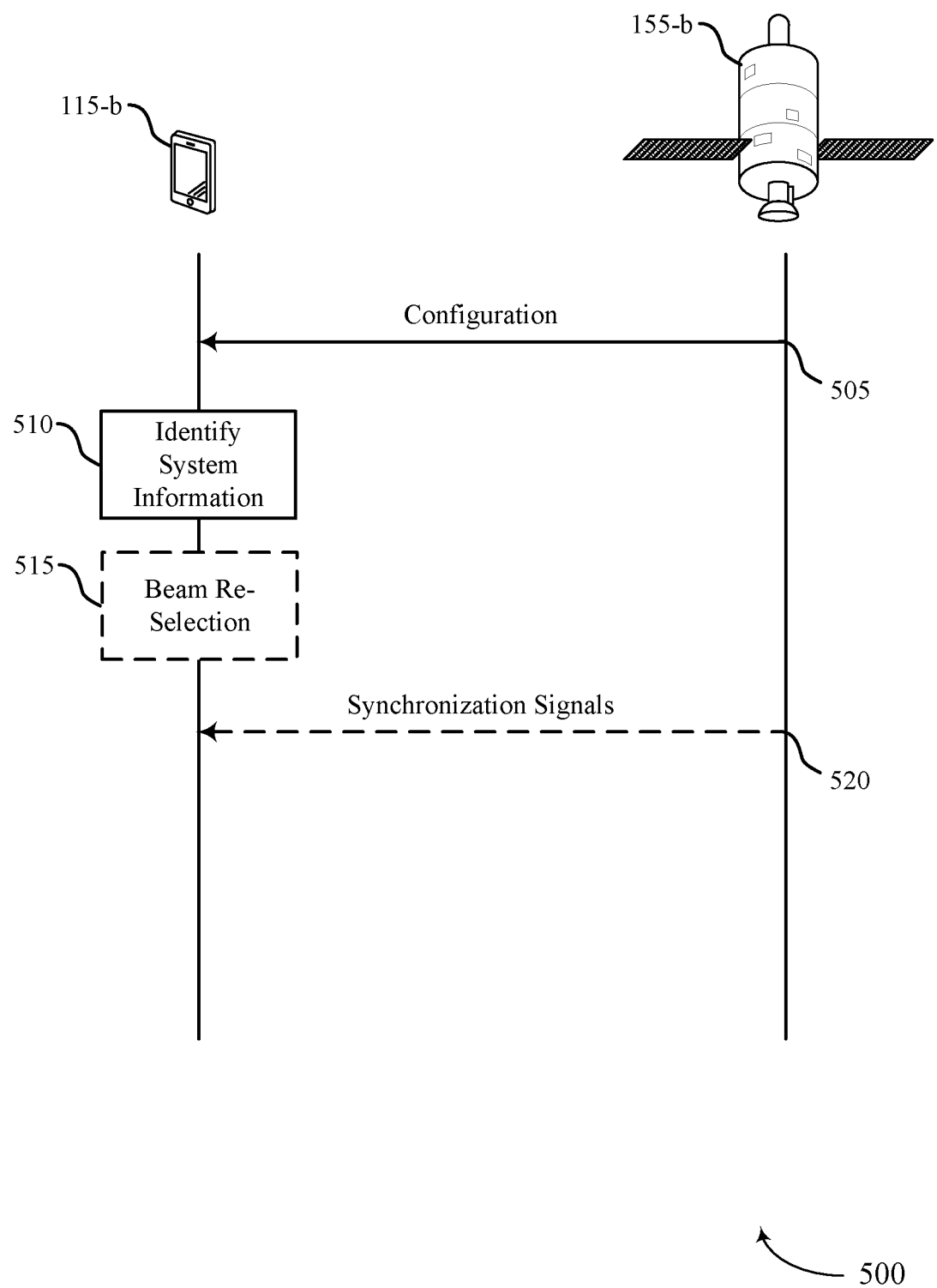
FIG. 5 illustrates an example of a process flow that supports beam reselection for narrowband NTNs in accordance with aspects of the present disclosure.

FIG. 5 illustrates an example of a process flow 500 that supports beam reselection for narrowband non-terrestrial networks in accordance with aspects of the present disclosure. In some examples, process flow 500 may implement aspects of wireless communications system 100 or wireless communications system 200. The process flow 500 may be implemented by the UE 115-*b*, the satellite 155-*b*, or both, which may be respective examples of a UE 115 and a satellite 155 or a base station 105 described herein. In some cases, the satellite 155-*b* may be an example of a transmitting terminal. In the following description of the process flow 500, the information communicated between the UE 115-*b* and the satellite 155-*b* may be communicated in a different order than the example order shown, or the operations performed by the UE 115-*b* and the satellite 155-*b* may be performed in different orders or at different times. Some operations may also be omitted from the process flow 500, and other operations may be added to the process flow 500. In the example of FIG. 5, the UE 115-*b* and the satellite 155-*b* may be in communication with each other via an NTN.

At 505, the UE 115-*b* may receive, on a first carrier of a first set of carriers associated with a first beam of a transmitting terminal, a configuration for the first set of carriers associated with the first beam and a second set of carriers associated with a second beam of the transmitting terminal, wherein the first carrier conveys a first set of synchronization signals. In some cases, a second carrier of the second set of carriers may convey a second set of synchronization signals. In some cases, the UE 115-*b* may receive system information on the first carrier, where the system information corresponds to one or more carriers in one or more beams including at least the first beam and the second beam.

At 510, the UE 115-*b* may identify at least a portion of system information associated with the second set of carriers based on the configuration. For example, in some cases, the UE 115-*b* may be indicated which system information is common between the first set of carriers and the second set of carriers. In some examples, the first set of carriers and the second set of carriers may belong to a same cell. In some cases, the first set of carriers and the second set of carriers may belong to different cells.

In some cases, at 515, the UE 115-*b* may perform a beam reselection. For example, the UE 115-*b* may reselect to a second carrier of the second set of carriers based on the configuration for the second set of carriers. At 520, the UE 115-*b* may receive the second set of synchronization signals on the second carrier of the second set of carriers based at least in part on the configuration for the second set of carriers. Therefore, by implementing the techniques described herein, the UE 115-*b* may efficiently reselect from a first beam of the satellite 155-*b* to a second beam of the satellite 155-*b*. For example, the UE 115-*b* may receive an indication of system information for the second beam of the satellite 155-*b*.

In some examples, the UE 115-*b* may receive synchronization information on the first carrier, where the synchronization information corresponds to one or more other carriers in one or more other beams including at least the second beam. In some examples, the synchronization information may include a relative or absolute frequency synchronization parameter, a relative or absolute time synchronization parameter, a time-domain pre-compensation parameter, a frequency-domain pre-compensation parameter, information associated with an MIB, or any combination thereof. In some cases, the UE 115-*b* may synchronize to the one or more other carriers based on the synchronization information. In an example, the UE 115-*b* may synchronize to the second carrier based on the synchronization information after reselecting to the second carrier.

Figure 6:
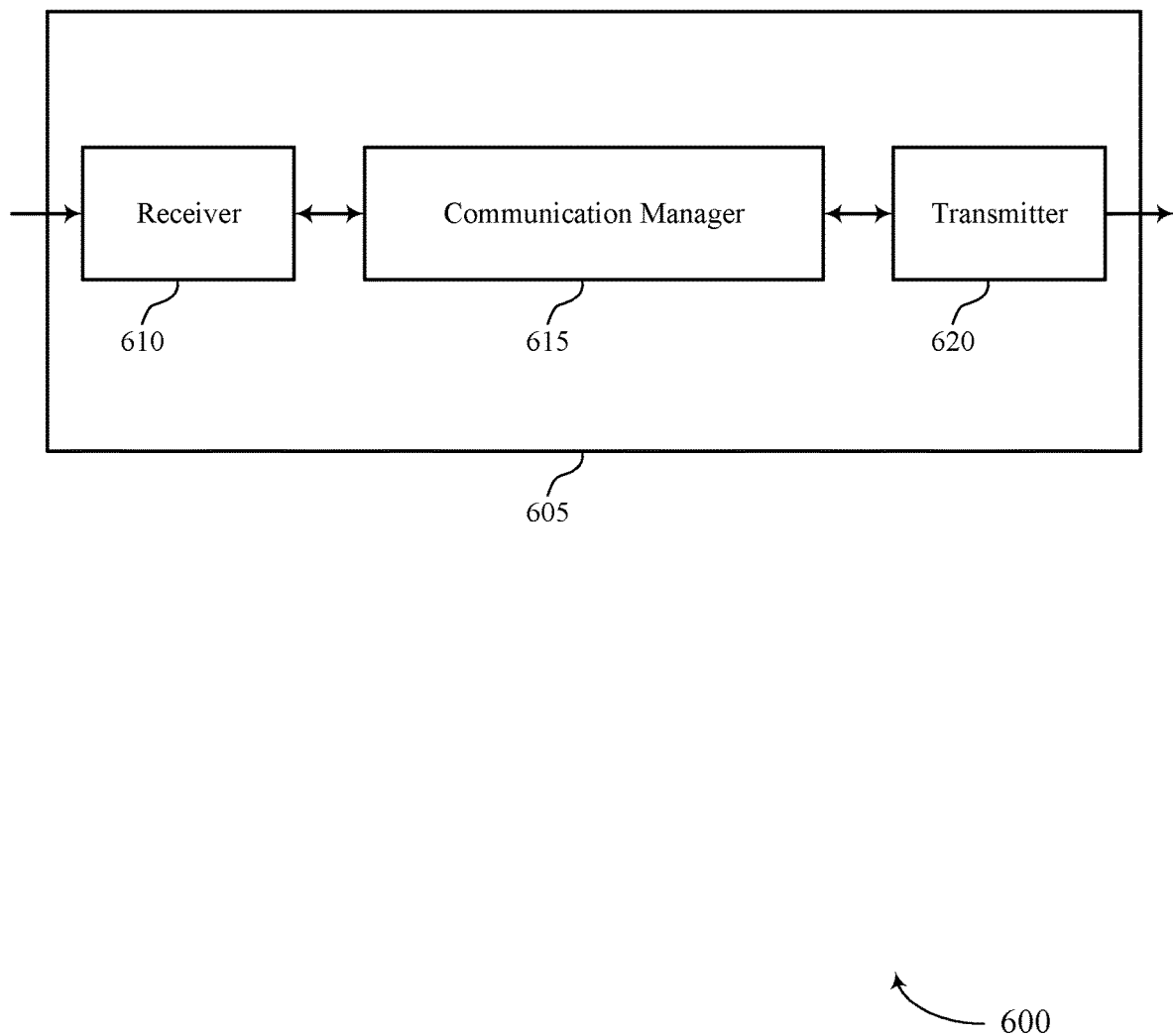
FIGS. 6 and 7 show block diagrams of devices that support beam reselection for narrowband NTNs in accordance with aspects of the present disclosure.

FIG. 6 shows a block diagram 600 of a device 605 that supports beam reselection for narrowband non-terrestrial networks in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam reselection for narrowband non-terrestrial networks, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may receive, on a first carrier of a first set of carriers associated with a first beam of a transmitting terminal, a configuration for the first set of carriers associated with the first beam and a second set of carriers associated with a second beam of the transmitting terminal, where the first carrier conveys a first set of synchronization signals, and identify at least a portion of a carrier group configuration associated with the second set of carriers. The communication manager 615 may also receive, on a first beam associated with a first cell of a transmitting terminal, a configuration for the first beam and a second beam associated with a second cell of a transmitting terminal, where the first beam conveys a first set of synchronization signals, and the second beam conveys a second set of synchronization signals and identify at least a portion of a cell configuration associated with the second beam based on the configuration. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 615 as described herein may be implemented to realize one or more potential advantages. One implementation may allow a UE 115 to save power and reduce latency by efficiently performing a beam reselection. By implementing the techniques described herein, the UE 115 may not re-obtain all system information upon making a beam reselection, as the UE 115 may receive indications of system information on the target beam. In some cases, these techniques may streamline a synchronization process. For example, the UE 115 may receive an indication of some synchronization parameters (e.g., relative frequency offsets, doppler pre-compensation, etc. may be provided from one beam to another), and the UE 115 may have a lighter system information read on the target beam to enable faster beam camping, more power efficient beam camping, or both.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

Figure 7:
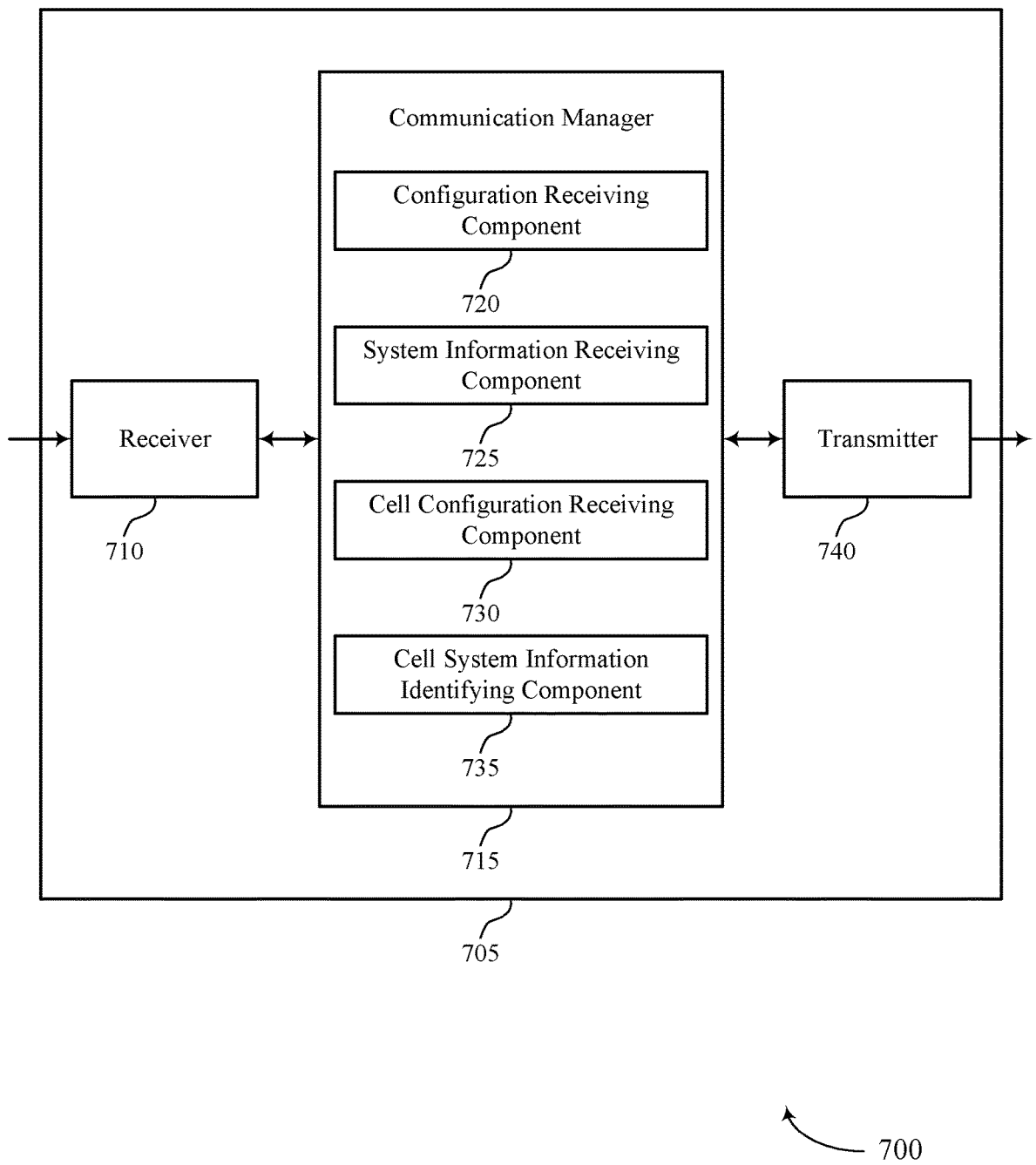

FIG. 7 shows a block diagram 700 of a device 705 that supports beam reselection for narrowband non-terrestrial networks in accordance with aspects of the present disclosure. The device 705 may be an example of aspects of a device 605, or a UE 115 as described herein. The device 705 may include a receiver 710, a communication manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to beam reselection for narrowband non-terrestrial networks, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include a configuration receiving component 720, a system information receiving component 725, a cell configuration receiving component 730, and a cell system information identifying component 735. The communication manager 715 may be an example of aspects of the communication manager 910 described herein.

The configuration receiving component 720 may receive, on a first carrier of a first set of carriers associated with a first beam of a transmitting terminal, a configuration for the first set of carriers associated with the first beam and a second set of carriers associated with a second beam of the transmitting terminal, where the first carrier conveys a first set of synchronization signals.

The system information receiving component 725 may identify at least a portion of a carrier group configuration associated with the second set of carriers based on the configuration.

The cell configuration receiving component 730 may receive, on a first beam associated with a first cell of a transmitting terminal, a configuration for the first beam and a second beam associated with a second cell of a transmitting terminal, where the first beam conveys a first set of synchronization signals, and the second beam conveys a second set of synchronization signals.

The cell system information identifying component 735 may identify at least a portion of a cell configuration associated with the second beam based on the configuration.

The transmitter 740 may transmit signals generated by other components of the device 705. In some examples, the transmitter 740 may be collocated with a receiver 710 in a transceiver module. For example, the transmitter 740 may be an example of aspects of the transceiver 915 described with reference to FIG. 9. The transmitter 740 may utilize a single antenna or a set of antennas.

Figure 8:
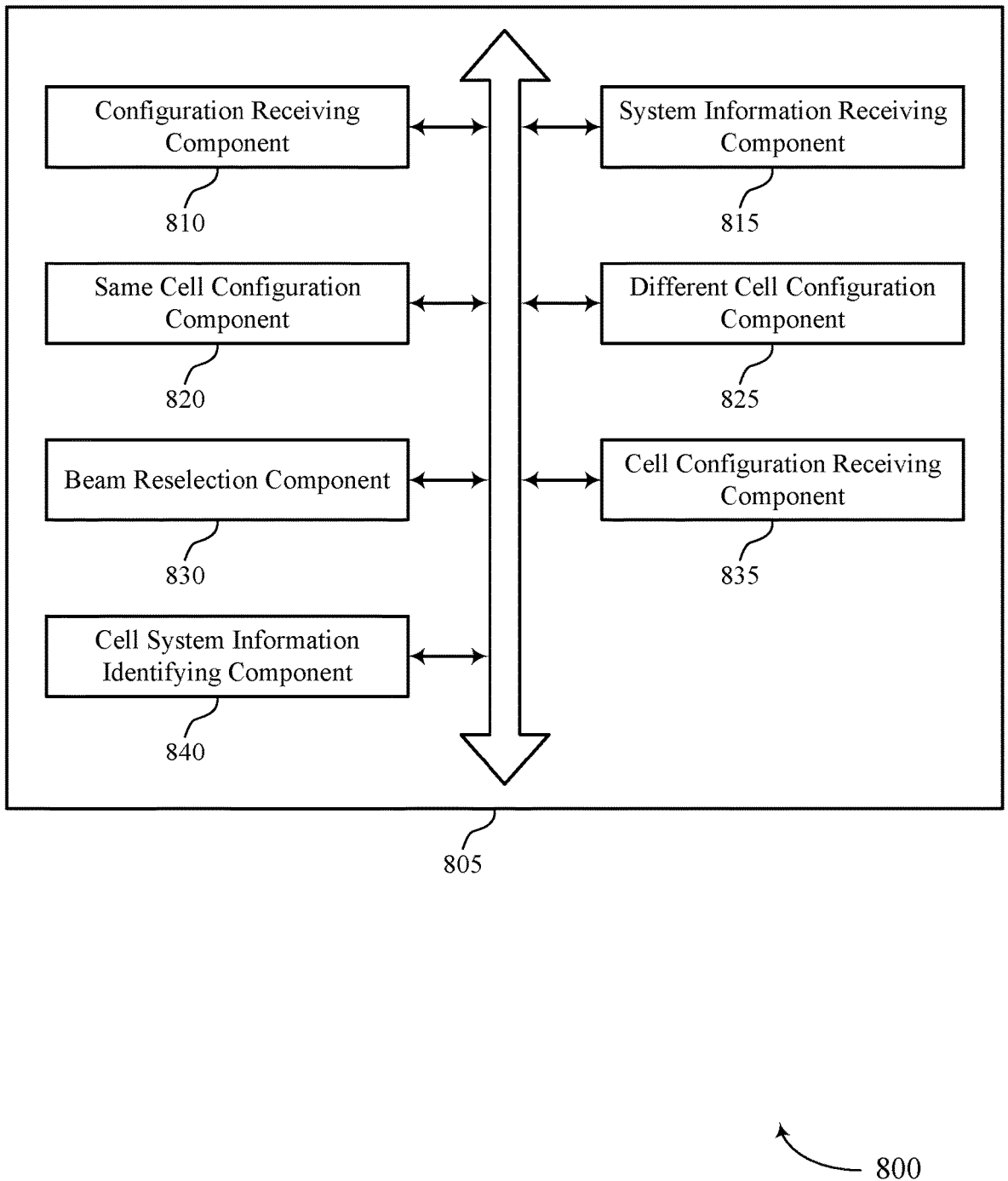
FIG. 8 shows a block diagram of a communication manager that supports beam reselection for narrowband NTNs in accordance with aspects of the present disclosure.

FIG. 8 shows a block diagram 800 of a communication manager 805 that supports beam reselection for narrowband non-terrestrial networks in accordance with aspects of the present disclosure. The communication manager 805 may be an example of aspects of a communication manager 615, a communication manager 715, or a communication manager 910 described herein. The communication manager 805 may include a configuration receiving component 810, a system information receiving component 815, a same cell configuration component 820, a different cell configuration component 825, a beam reselection component 830, a cell configuration receiving component 835, and a cell system information identifying component 840. Each of these modules may communicate, directly or indirectly, with one another (e.g., via one or more buses).

The configuration receiving component 810 may receive, on a first carrier of a first set of carriers associated with a first beam of a transmitting terminal, a configuration for the first set of carriers associated with the first beam and a second set of carriers associated with a second beam of the transmitting terminal, where the first carrier conveys a first set of synchronization signals. In some examples, the configuration receiving component 810 may receive system information on the first carrier, where the system information corresponds to one or more carriers in one or more beams including at least the first and second beams. In some examples, the configuration receiving component 810 may receive an MIB specific to a corresponding set of carriers. In some examples, the configuration receiving component 810 may identify a default configuration for group-specific system information for the corresponding set of carriers based on the MIB. The system information receiving component 815 may identify at least a portion of a carrier group configuration for the second set of carriers based on the configuration.

In some examples, the configuration receiving component 810 may receive synchronization information on the first carrier, wherein the synchronization information corresponds to one or more other carriers in one or more other beams including at least the second beam. In some examples, the synchronization information may comprise a relative or absolute frequency synchronization parameter, a relative or absolute time synchronization parameter, a time-domain pre-compensation parameter, a frequency-domain pre-compensation parameter, information associated with an MIB, or any combination thereof. In some examples, the configuration receiving component 810 may synchronize to the one or more other carriers based at least in part on the synchronization information.

In some examples, the MIB may be specific to the first set of carriers, the second set of carriers, or another set of carriers. In some examples, the MIB may be specific to the corresponding set of carriers based at least in part on a payload content, a scrambling sequence, or both. In some examples, the MIB indicates system information common between the first set of carriers and the corresponding set of carriers. In some examples, the MIB indicates carrier group-specific SIBs for the corresponding set of carriers. In some examples, the MIB is received on a physical broadcast channel. In some examples, the MIB indicates whether a carrier group-specific system information is present for the corresponding set of carriers.

In some examples, the first beam, the second beam, the first carrier, the second carrier, the first set of carriers, the second set of carriers, or any combination thereof, are used for narrowband internet of things communications. In some examples, the transmitting terminal is a satellite of a non-terrestrial network.

The cell configuration receiving component 835 may receive, on a first beam associated with a first cell of a transmitting terminal, a configuration for the first beam and a second beam associated with a second cell of a transmitting terminal, where the first beam conveys a first set of synchronization signals, and the second beam conveys a second set of synchronization signals. In some examples, the cell configuration receiving component 835 may reselect to the second beam based on the configuration for the second beam. In some examples, the cell configuration receiving component 835 may receive the second set of synchronization signals on the second beam based on the configuration for the second beam.

In some examples, the cell configuration receiving component 835 may receive system information on the first beam, where the system information corresponds to one or more cells including at least the second cell. In some examples, the cell configuration receiving component 835 may receive a common system information on the first cell, where the common system information is applied for at least the first cell and the second cell.

In some examples, the cell configuration receiving component 835 may receive a second system information on the first cell for the second cell, where a first received system information for the first cell is at least partially different from the second system information for the second cell. In some examples, the cell configuration receiving component 835 may receive an indication of at least one carrier frequency corresponding to at least the second beam. In some examples, the cell configuration receiving component 835 may receive an idle mode beam reselection configuration, where the UE reselects to the second beam based on the idle mode beam reselection configuration. The cell system information identifying component 840 may identify at least a portion of a cell configuration associated with the second beam based on the configuration.

The same cell configuration component 820 may receive a cell configuration for a cell including at least the first set of carriers and the second set of carriers, where the cell configuration includes at least configurations for the first set of carriers and the second set of carriers. In some examples, the same cell configuration component 820 may receive a common system information on the first carrier for the cell, where the common system information is applied for at least the first set of carriers and the second set of carriers.

In some examples, the same cell configuration component 820 may receive a second system information for the second set of carriers, where a first received system information for the first set of carriers is at least partially different from the second system information for the second set of carriers. In some examples, the same cell configuration component 820 may receive an indication of at least one carrier frequency corresponding to at least one carrier in the second set of carriers. In some examples, the indication of the carrier frequency includes a frequency shift value from the first set of carriers. In some examples, the second carrier is frequency shifted from the first carrier based on the frequency shift value, or where each carrier of the second set of carriers is frequency shifted from corresponding carriers of the first set of carriers based at least in part on the frequency shift value. In some examples, the indication of the carrier frequency includes one or more ARFCNs for the at least one carrier in the second set of carriers. In some examples, the system information corresponding to the first set of carriers includes scheduling information for at least a portion of system information associated with the second set of carriers.

The different cell configuration component 825 may receive a cell configuration on the first set of carriers for a second cell including at least the second set of carriers, where a first cell includes at least the first set of carriers. In some examples, the different cell configuration component 825 may receive identifiers for one or more corresponding cells of the set of cells at least partially having common system information.

In some examples, the different cell configuration component 825 may identify a first portion of common system information among carrier of the first cell and a second portion of common system information among one or more first carriers of the first cell and one or more second carriers of the second cell, where the first portion of common system information is different from the second portion of common system information. In some cases, the cell configuration includes a set of cell configurations for a set of cells, where the set of cells includes at least the first cell and the second cell. In some examples, the cell configuration for the second cell includes scheduling information for at least the portion of system information associated with the second cell.

The beam reselection component 830 may receive an indication of one or more carriers of one or more sets of carriers, where each carrier of the one or more carriers conveys corresponding sets of synchronization signals, and where the one or more carriers are indicated as candidate carriers corresponding to different beams for a beam reselection. In some examples, each candidate carrier may belong to a same cell as the first carrier or belongs to a different cell from the first carrier.

The beam reselection component 830 may reselect to a second carrier of the second set of carriers based at least in part on the configuration for the second set of carriers and receive a paging message on the second carrier prior to receiving a SIB on the second carrier based at least in part on the configuration.

In some examples, the beam reselection component 830 may receive a beam reselection indication to reselect to one of the candidate carriers, where the reselecting is based on the beam reselection indication. In some examples, the beam reselection component 830 may reselect to a second carrier of the second set of carriers based on the configuration for the second set of carriers. In some examples, the beam reselection component 830 may receive the second set of synchronization signals on the second carrier of the second set of carriers based on the configuration for the second set of carriers.

In some examples, the beam reselection indication is received via DCI, a MAC CE, or both. In some examples, each candidate carrier belongs to a same cell as the first carrier or belongs to a different cell from the first carrier. In some examples, the first set of carriers and the second set of carriers correspond to a first cell of the base station, or the first set of carriers corresponds to the first cell and the second set of carriers corresponds to a second cell.

In some examples, the beam reselection component 830 may receive an idle mode beam reselection configuration. In some examples, the beam reselection component 830 may reselect to a carrier of the second set of carriers while operating in an idle mode based on the idle mode beam reselection configuration. In some cases, the idle mode beam reselection configuration includes a first set of parameters for inter-cell reselection and a second set of parameters for intra-cell reselection, where the parameters include one or more of a threshold, an offset, or a hysteresis. In some cases, the idle mode beam reselection configuration includes a first set of parameters for inter-cell reselection among cells within a cell group and a second set of parameters for inter-cell reselection among cells across different cell groups, where the first set of parameters and the second set of parameters include one or more of a threshold, an offset, or a hysteresis.

Figure 9:
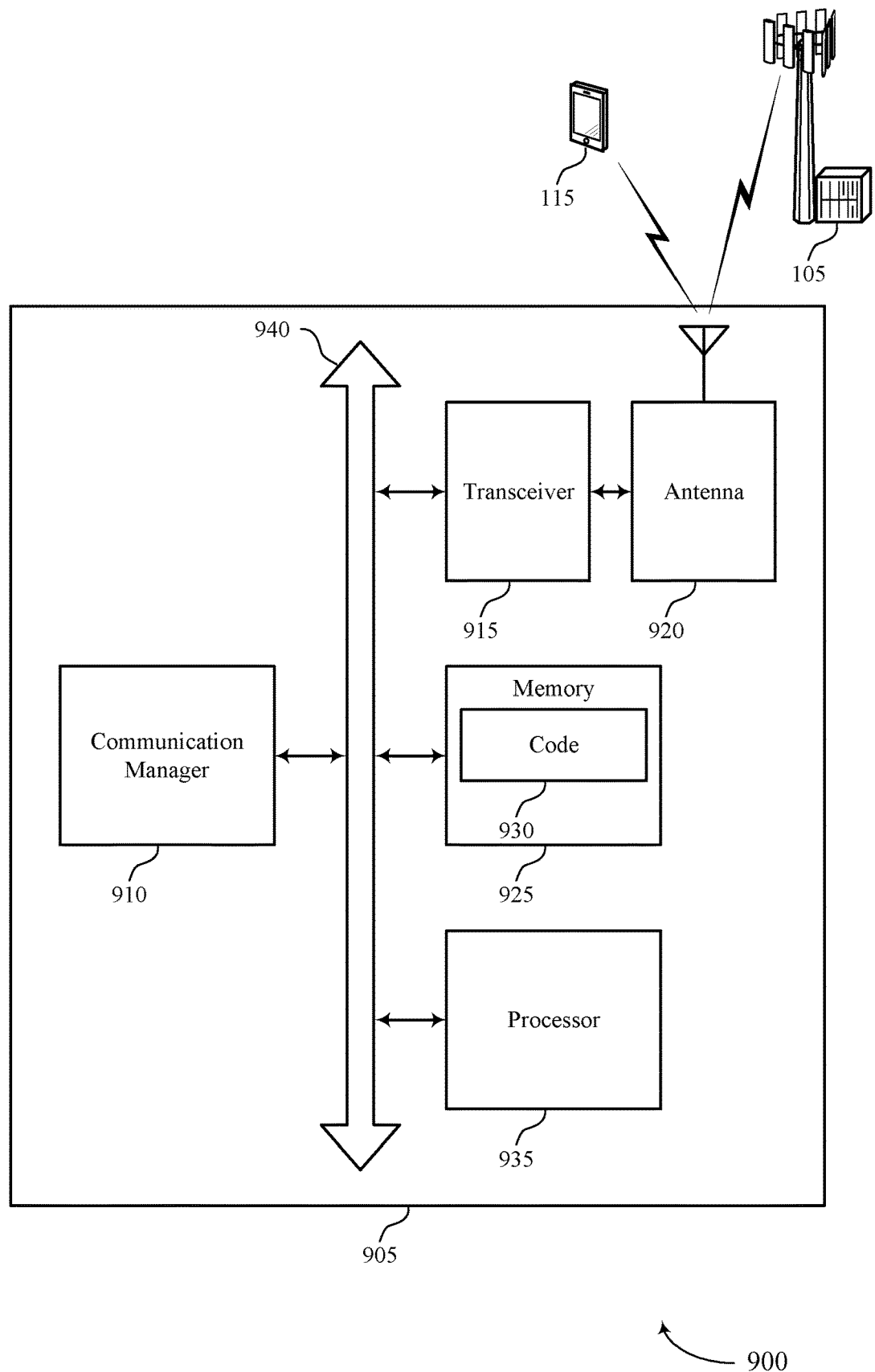
FIG. 9 shows a diagram of a system including a device that supports beam reselection for narrowband NTNs in accordance with aspects of the present disclosure.

FIG. 9 shows a diagram of a system 900 including a device 905 that supports beam reselection for narrowband non-terrestrial networks in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via one or more buses (e.g., bus 940).

The communication manager 910 may receive, on a first carrier of a first set of carriers associated with a first beam of a transmitting terminal, a configuration for the first set of carriers associated with the first beam and a second set of carriers associated with a second beam of the transmitting terminal, where the first carrier conveys a first set of synchronization signals, and identify at least a portion of a carrier group configuration for the second set of carriers based on the configuration. The communication manager 910 may also receive, on a first beam associated with a first cell of a transmitting terminal, a configuration for the first beam and a second beam associated with a second cell of a transmitting terminal, where the first beam conveys a first set of synchronization signals, and the second beam conveys a second set of synchronization signals and identify at least a portion of a cell configuration associated with the second beam based on the configuration.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic I/O system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting beam reselection for narrowband non-terrestrial networks).

Figure 10:
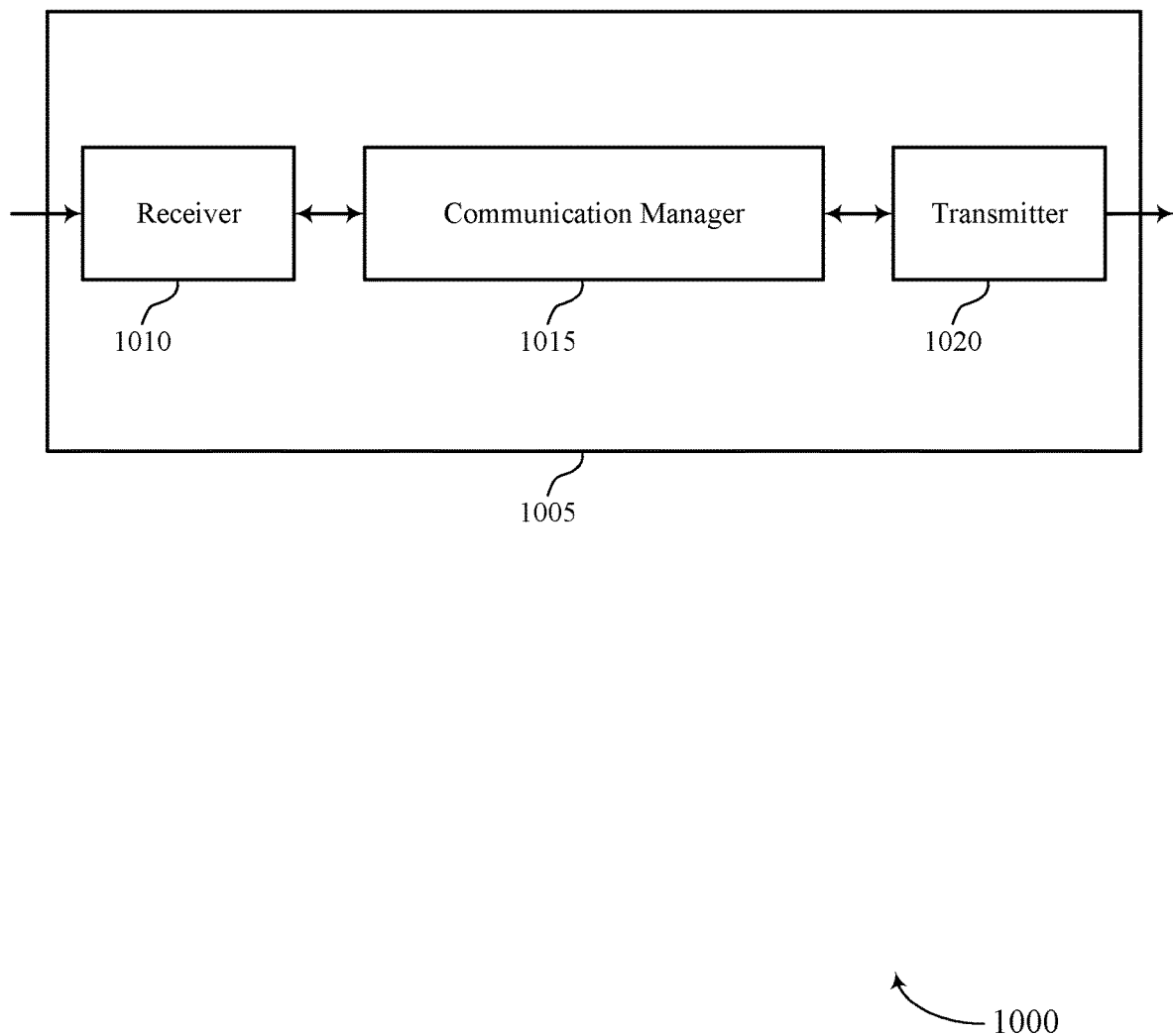
FIGS. 10 and 11 show block diagrams of devices that support beam reselection for narrowband NTNs in accordance with aspects of the present disclosure.

FIG. 10 shows a block diagram 1000 of a device 1005 that supports beam reselection for narrowband non-terrestrial networks in accordance with aspects of the present disclosure. The device 1005 may be an example of aspects of a base station 105 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to beam reselection for narrowband non-terrestrial networks, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may transmit, to a UE on a first carrier of a first set of carriers associated with a first beam of the base station, a configuration for the first set of carriers associated with a first beam and a second set of carriers associated with a second beam of the transmitting terminal, where the first carrier conveys a first set of synchronization signals, and indicate at least a portion of a carrier group configuration for the second set of carriers based on the configuration. The communication manager 1015 may also transmit, on a first beam associated with a first cell of the transmitting terminal, a configuration for the first beam and a second beam associated with a second cell of the transmitting terminal, where the first beam conveys a first set of synchronization signals, and the second beam conveys a second set of synchronization signals and identify at least a portion of a cell configuration associated with the second beam based on the configuration. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
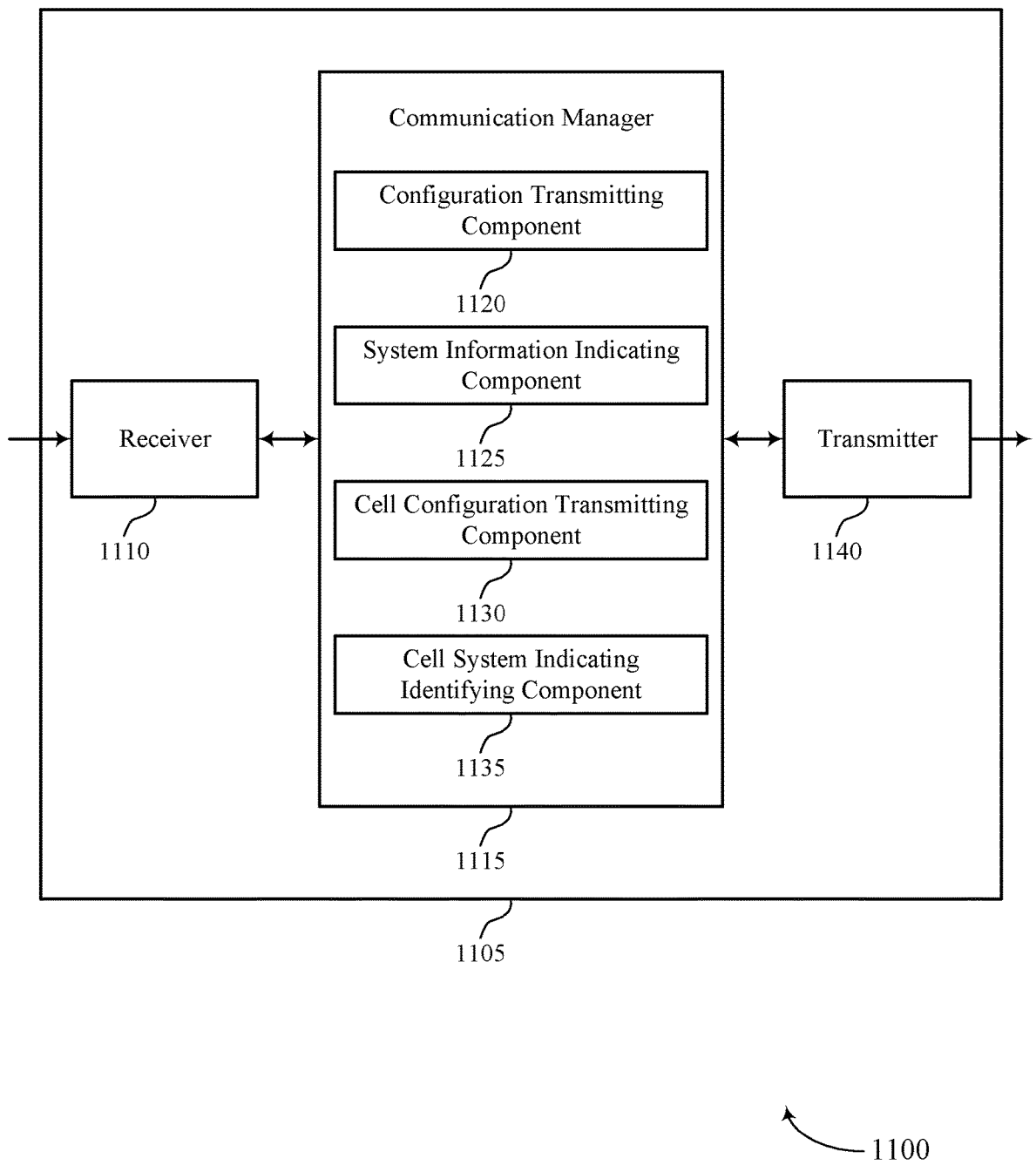

FIG. 11 shows a block diagram 1100 of a device 1105 that supports beam reselection for narrowband non-terrestrial networks in accordance with aspects of the present disclosure. The device 1105 may be an example of aspects of a device 1005, or a base station 105 as described herein. The device 1105 may include a receiver 1110, a communication manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to beam reselection for narrowband non-terrestrial networks, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include a configuration transmitting component 1120, a system information indicating component 1125, a cell configuration transmitting component 1130, and a cell system information indicating component 1135. The communication manager 1115 may be an example of aspects of the communication manager 1310 described herein.

The configuration transmitting component 1120 may transmit, to a UE on a first carrier of a first set of carriers associated with a first beam of the base station, a configuration for the first set of carriers associated with a first beam and a second set of carriers associated with a second beam of the transmitting terminal, where the first carrier conveys a first set of synchronization signals.

The system information indicating component 1125 may indicate at least a portion of a carrier group configuration for the second set of carriers based on the configuration.

The cell configuration transmitting component 1130 may transmit, on a first beam associated with a first cell of the transmitting terminal, a configuration for the first beam and a second beam associated with a second cell of the transmitting terminal, where the first beam conveys a first set of synchronization signals, and the second beam conveys a second set of synchronization signals.

The cell system information indicating component 1135 may indicate at least a portion of a cell configuration associated with the second beam based on the configuration.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
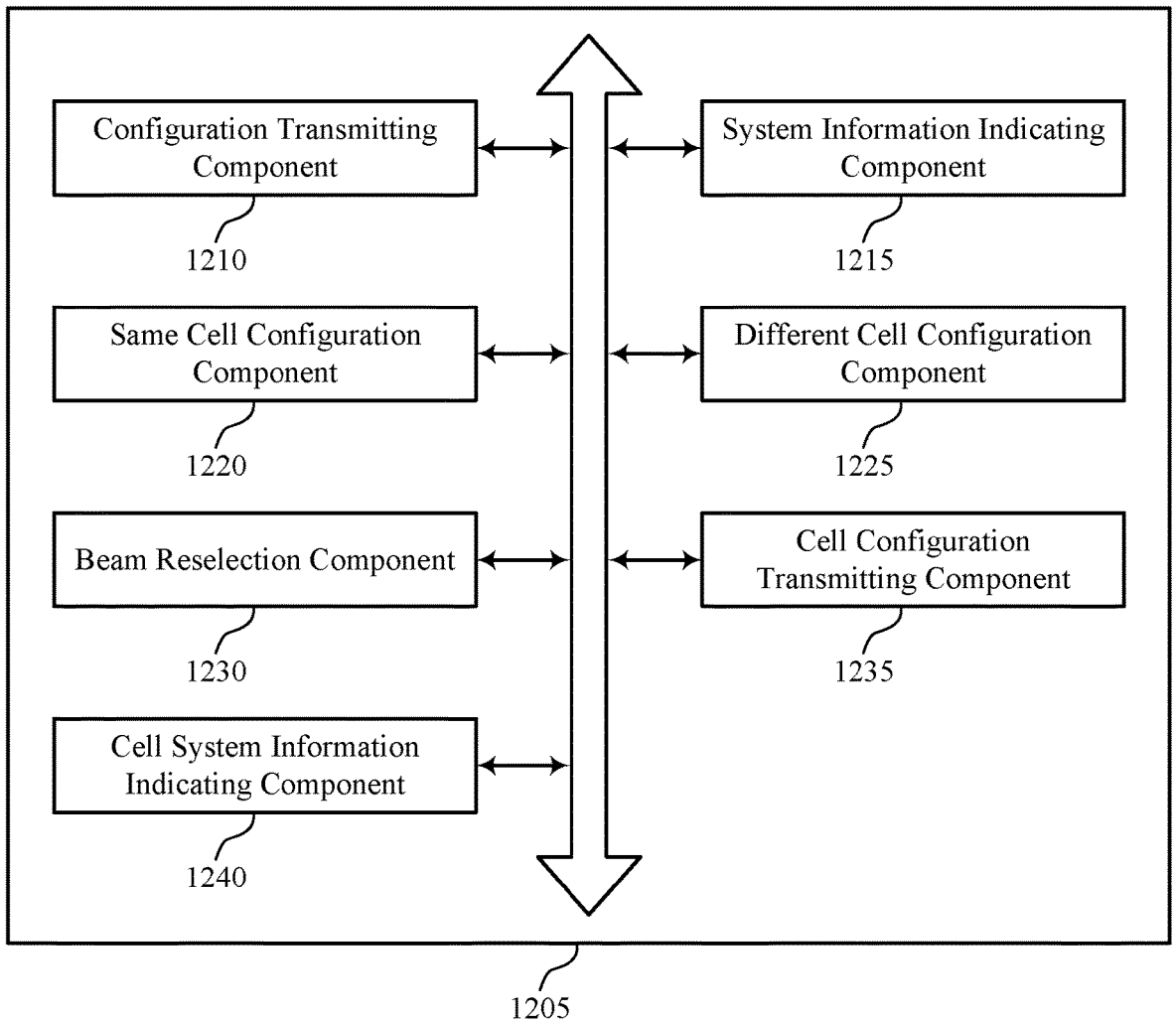
FIG. 12 shows a block diagram of a communication manager that supports beam reselection for narrowband NTNs in accordance with aspects of the present disclosure.

FIG. 12 shows a block diagram 1200 of a communication manager 1205 that supports beam reselection for narrowband non-terrestrial networks in accordance with aspects of the present disclosure. The communication manager 1205 may be an example of aspects of a communication manager 1015, a communication manager 1115, or a communication manager 1310 described herein. The communication manager 1205 may include a configuration transmitting component 1210, a system information indicating component 1215, a same cell configuration component 1220, a different cell configuration component 1225, a beam reselection component 1230, a cell configuration transmitting component 1235, and a cell system information indicating component 1240. Each of these modules may communicate, directly or indirectly, with one another (e.g., via one or more buses).

The configuration transmitting component 1210 may transmit, to a UE on a first carrier of a first set of carriers associated with a first beam of the base station, a configuration for the first set of carriers associated with a first beam and a second set of carriers associated with a second beam of the transmitting terminal, where the first carrier conveys a first set of synchronization signals. In some examples, the configuration transmitting component 1210 may transmit system information on the first carrier, where the system information corresponds to one or more carriers in one or more beams including at least the first and second beams.

The configuration transmitting component 1210 may transmit synchronization information on the first carrier, wherein the synchronization information corresponds to one or more other carriers in one or more other beams including at least the second beam. In some examples, the synchronization information may include a relative or absolute frequency synchronization parameter, a relative or absolute time synchronization parameter, a time-domain pre-compensation parameter, a frequency-domain pre-compensation parameter, information associated with an MIB, or any combination thereof. In some cases, the configuration transmitting component 1210 may synchronize the UE to the one or more other carriers based on the synchronization information In some examples, the configuration transmitting component 1210 may transmit an MIB specific to a corresponding set of carriers. In some examples, the configuration transmitting component 1210 may indicate a default configuration for group-specific system information for the corresponding set of carriers based on the MIB. The system information indicating component 1215 may indicate at least a portion of a carrier group configuration for the second set of carriers based on the configuration.

In some examples, the MIB is specific to the first set of carriers, the second set of carriers, or another set of carriers. In some examples, the MIB is specific to the corresponding set of carriers based at least in part on a payload content, a scrambling sequence, or both. In some examples, the MIB indicates system information common between the first set of carriers and the corresponding set of carriers. In some examples, the MIB indicates carrier group-specific system information for the corresponding set of carriers. In some examples, the MIB is transmitted on a physical broadcast channel. In some examples, the MIB indicates whether a carrier group-specific system information is present for the corresponding set of carriers.

In some examples, the transmitting terminal is a satellite of a non-terrestrial network. In some examples, the first beam, the second beam, the first carrier, the second carrier, the first set of carriers, the second set of carriers, or any combination thereof, are used for narrowband internet of things communications.

The cell configuration transmitting component 1235 may transmit, on a first beam associated with a first cell of the transmitting terminal, a configuration for the first beam and a second beam associated with a second cell of the transmitting terminal, where the first beam conveys a first set of synchronization signals, and the second beam conveys a second set of synchronization signals. In some examples, the cell configuration transmitting component 1235 may reselect the UE to the second beam based on the configuration. In some examples, the cell configuration transmitting component 1235 may transmit the second set of synchronization signals on the second beam based on the configuration for the second beam.

In some examples, the cell configuration transmitting component 1235 may transmit system information on the first beam, where the system information corresponds to one or more cells including at least the second cell. In some examples, the cell configuration transmitting component 1235 may transmit a common system information on the first cell, where the common system information is applied for at least the first cell and the second cell.

In some examples, the cell configuration transmitting component 1235 may transmit a second system information on the first cell for the second cell, where a first transmitted system information for the first cell is at least partially different from the second system information for the second cell. In some examples, the cell configuration transmitting component 1235 may transmit an indication of at least one carrier frequency corresponding to at least the second beam. In some examples, the cell configuration transmitting component 1235 may transmit an idle mode beam reselection configuration, where the UE reselects to the second beam based on the idle mode beam reselection configuration. The cell system information indicating component 1240 may indicate at least a portion of a cell configuration associated with the second beam based on the configuration.

The same cell configuration component 1220 may transmit a cell configuration for a cell including at least the first set of carriers and the second set of carriers, where the cell configuration includes at least the configuration for the first set of carriers and the second set of carriers. In some examples, the same cell configuration component 1220 may transmit a common system information on the carrier for the cell, where the common system information is applied for at least the first set of carriers and the second set of carriers.

In some examples, the same cell configuration component 1220 may transmit a second system information for the second set of carriers, where a first transmitted system information for the first set of carriers is at least partially different from the second system information for the second set of carriers. In some examples, the same cell configuration component 1220 may transmit an indication of at least one carrier frequency corresponding to at least one carrier in the second set of carriers. In some examples, the indication of the carrier frequency includes a frequency shift value from the first set of carriers. In some examples, the second carrier is frequency shifted from the first carrier based at least in part on the frequency shift value, or wherein each carrier of the second set of carriers is frequency shifted from corresponding carriers of the first set of carriers based at least in part on the frequency shift value. In some examples, the indication of the carrier frequency includes one or more ARFCNs for at least one carrier in the second set of carriers. In some examples, the system information corresponding to the first set of carriers includes scheduling information for at least a portion of system information corresponding to the second set of carriers.

The different cell configuration component 1225 may transmit a cell configuration on the first set of carriers for a second cell including at least the second set of carriers, where a first cell includes at least the first set of carriers. In some examples, the different cell configuration component 1225 may transmit identifiers for one or more corresponding cells of the set of cells at least partially having common system information.

In some examples, the different cell configuration component 1225 may indicate a first portion of common system information among carriers of the first cell and a second portion of common system information among a first one or more carriers of the first cell and a second one or more carriers of the second cell, where the first portion of common system information is different from the second portion of common system information. In some cases, the cell configuration includes a set of cell configurations for a set of cells, where the set of cells includes at least the first cell and the second cell. In some examples, the cell configuration includes an indication of at least one carrier frequency corresponding to at least one carrier in the second set of carriers. In some examples, the cell configuration for the second cell includes scheduling information for at least a portion of system information corresponding to the second cell.

The beam reselection component 1230 may transmit an indication of one or more carriers of one or more sets of carriers, where each carrier of the one or more carriers conveys corresponding sets of synchronization signals, and where the one or more carriers are indicated as candidate carriers corresponding to different beams for a beam reselection. In some examples, the beam reselection component 1230 may transmit a beam reselection indication to reselect the UE to the second carrier, where the UE is reselected to the second carrier based on the beam reselection indication. In some examples, the beam reselection indication is transmitted via DCI, a MAC CE, or both. In some examples, each candidate carrier belongs to a same cell as the first carrier or belongs to a different cell from the first carrier. In some examples, the first set of carriers and the second set of carriers correspond to a first cell of the base station, or the first set of carriers corresponds to the first cell and the second set of carriers corresponds to a second cell.

In some examples, the beam reselection component 1230 may reselect to a second carrier of the second set of carriers based on the configuration for the second set of carriers. In some examples, the beam reselection component 1230 may transmit the second set of synchronization signals on the second carrier of the second set of carriers based on the configuration for the second set of carriers.

In some examples, the beam reselection component 1230 may transmit an idle mode beam reselection configuration. In some examples, the beam reselection component 1230 may reselect the UE to a carrier of the second set of carriers while operating in an idle mode based on the idle mode beam reselection configuration. In some cases, the idle mode beam reselection configuration includes a first set of parameters for inter-cell reselection and a second set of parameters for intra-cell reselection, wherein the parameters include one or more of a threshold, an offset, or a hysteresis. In some cases, the idle mode beam reselection configuration includes a first set of parameters for inter-cell reselection among cells within a cell group and a second set of parameters for inter-cell reselection among cells across different cell groups, wherein the first set of parameters and the second set of parameters include one or more of a threshold, an offset, or a hysteresis.

Figure 13:
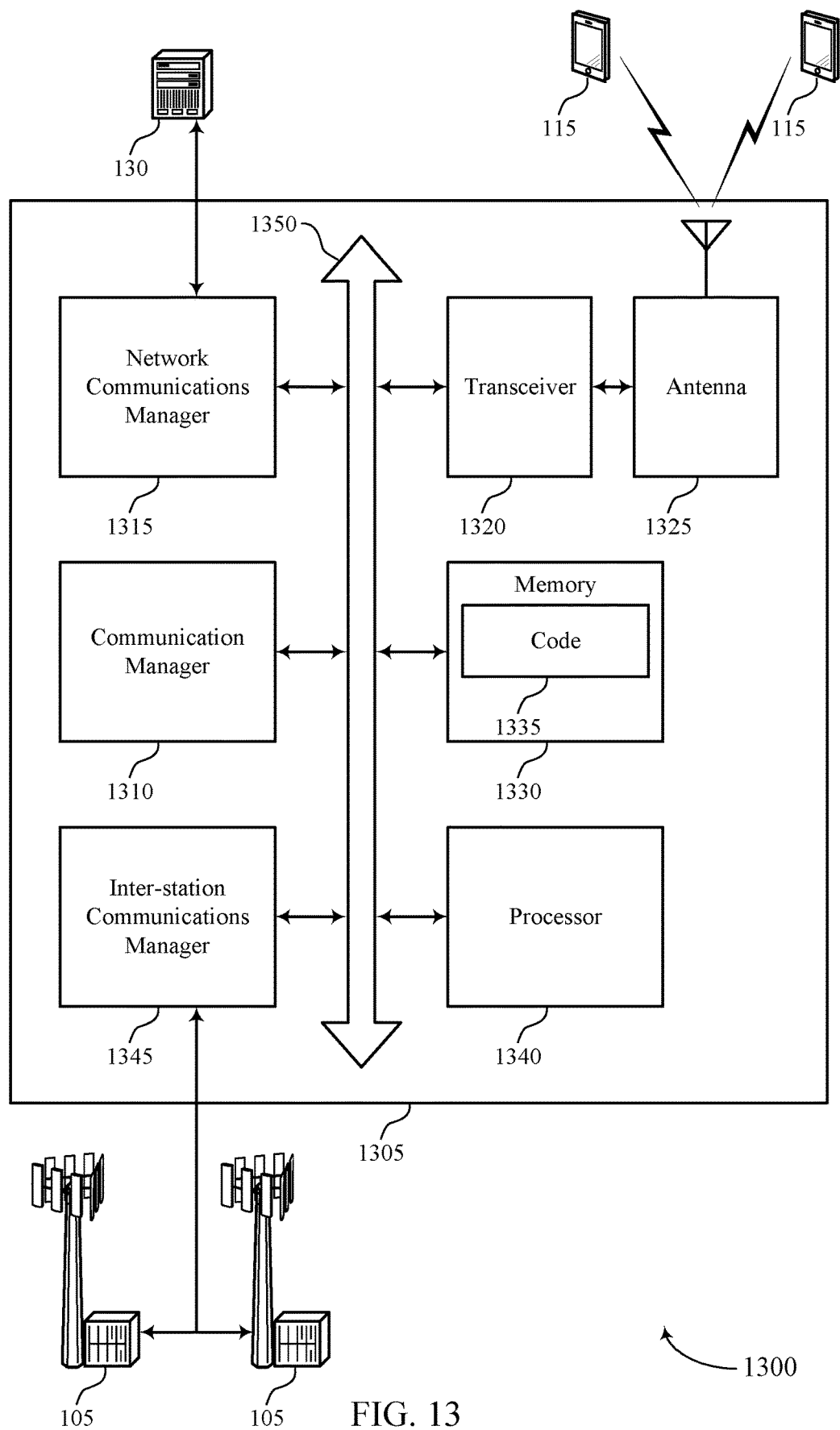
FIG. 13 shows a diagram of a system including a device that supports beam reselection for narrowband NTNs in accordance with aspects of the present disclosure.

FIG. 13 shows a diagram of a system 1300 including a device 1305 that supports beam reselection for narrowband non-terrestrial networks in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communication manager 1310 may transmit, to a UE on a first carrier of a first set of carriers associated with a first beam of the base station, a configuration for the first set of carriers associated with a first beam and a second set of carriers associated with a second beam of the transmitting terminal, where the first carrier conveys a first set of synchronization signals, and indicate at least a portion of a carrier group configuration for the second set of carriers based on the configuration. The communication manager 1310 may also transmit, on a first beam associated with a first cell of the transmitting terminal, a configuration for the first beam and a second beam associated with a second cell of the transmitting terminal, where the first beam conveys a first set of synchronization signals, and the second beam conveys a second set of synchronization signals and identify at least a portion of a cell configuration associated with the second beam based on the configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting beam reselection for narrowband non-terrestrial networks).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
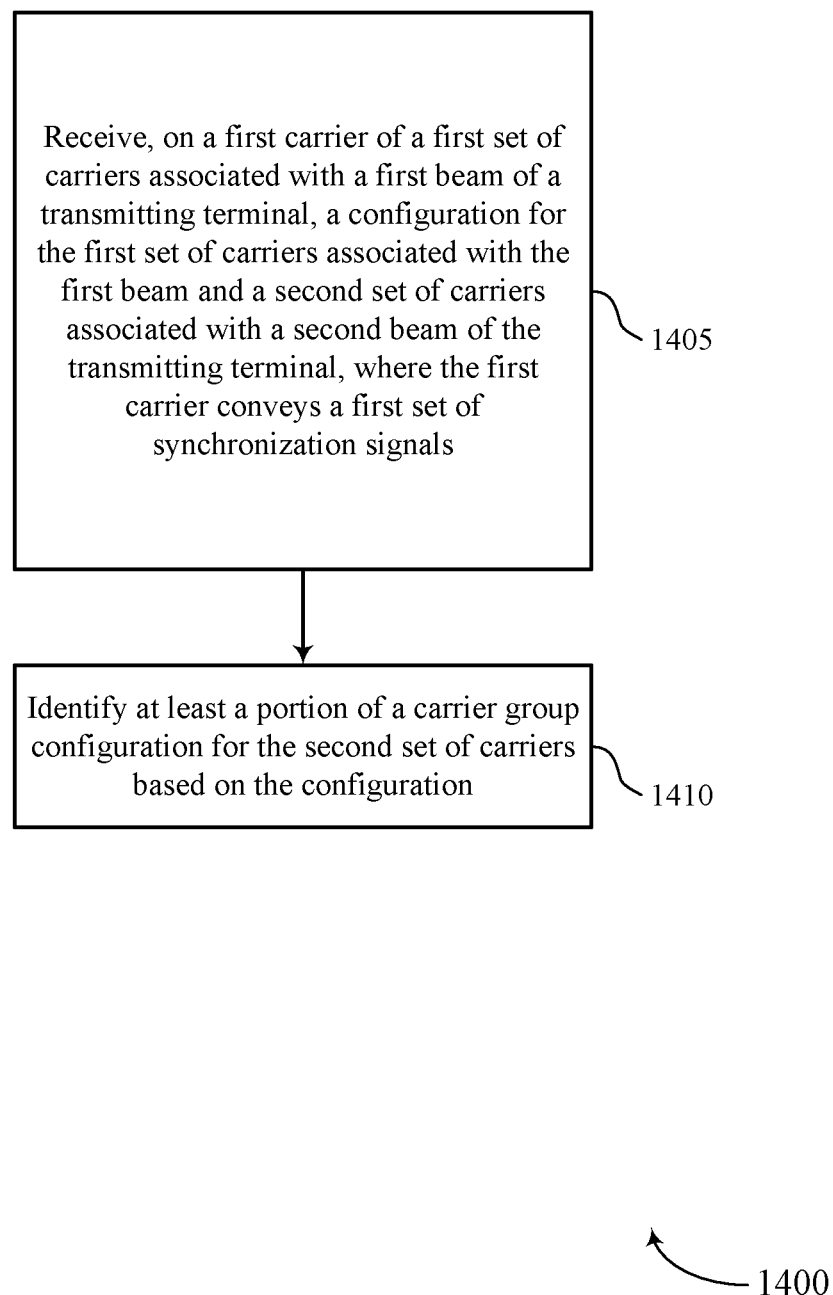
FIGS. 14 through 18 show flowcharts illustrating methods that support beam reselection for narrowband NTNs in accordance with aspects of the present disclosure.

FIG. 14 shows a flowchart illustrating a method 1400 that supports beam reselection for narrowband non-terrestrial networks in accordance with aspects of the present disclosure. The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1405, the UE may receive, on a first carrier of a first set of carriers associated with a first beam of a transmitting terminal, a configuration for the first set of carriers associated with the first beam and a second set of carriers associated with a second beam of the transmitting terminal, where the first carrier conveys a first set of synchronization signals. The operations of 1405 may be performed according to the methods described herein. In some examples, aspects of the operations of 1405 may be performed by a configuration receiving component as described with reference to FIGS. 6 through 9.

At 1410, the UE may identify at least a portion of a carrier group configuration for the second set of carriers based on the configuration. The operations of 1410 may be performed according to the methods described herein. In some examples, aspects of the operations of 1410 may be performed by a system information receiving component as described with reference to FIGS. 6 through 9.

Figure 15:
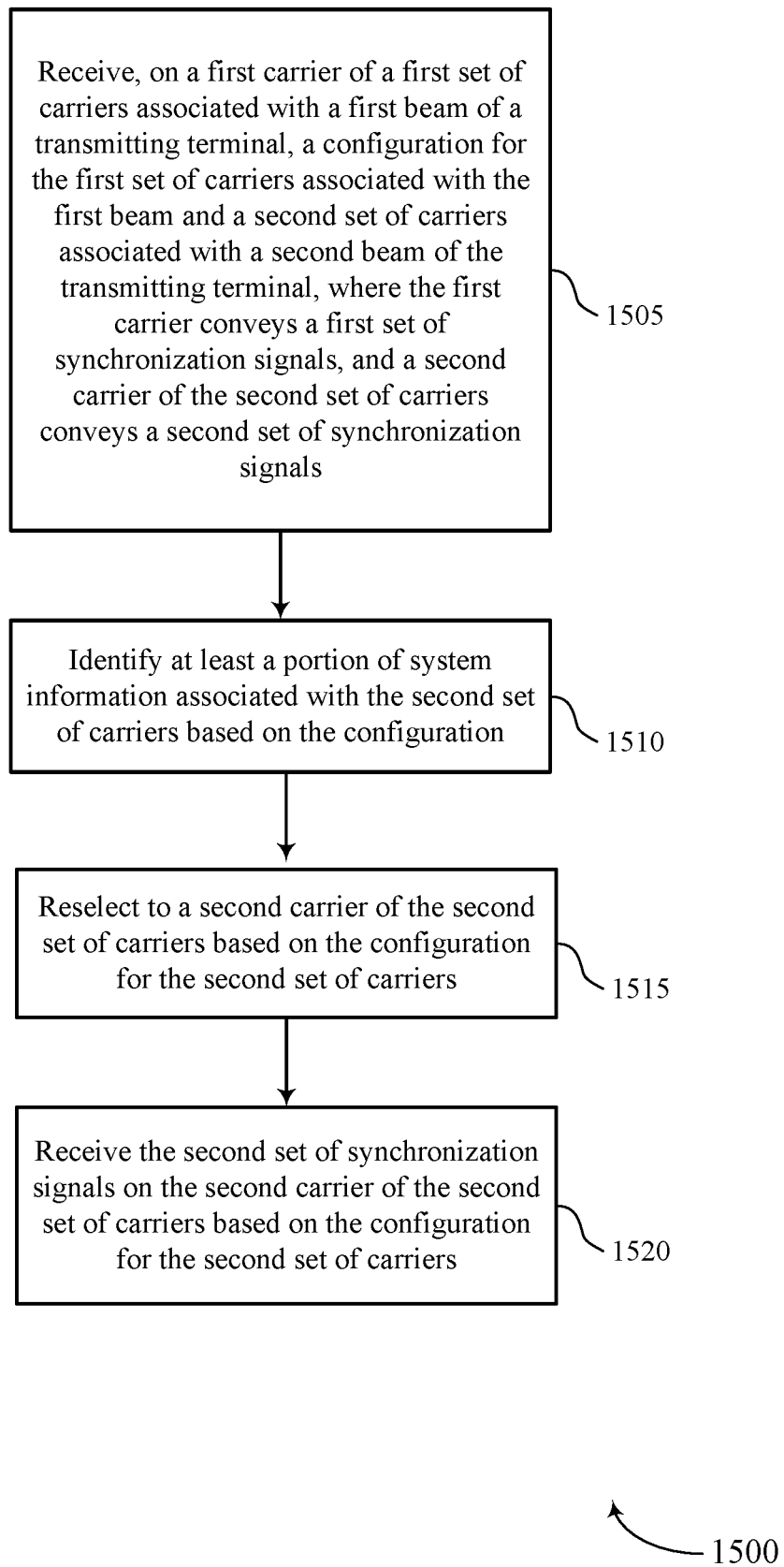

FIG. 15 shows a flowchart illustrating a method 1500 that supports beam reselection for narrowband non-terrestrial networks in accordance with aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1505, the UE may receive, on a first carrier of a first set of carriers associated with a first beam of a transmitting terminal, a configuration for the first set of carriers associated with the first beam and a second set of carriers associated with a second beam of the transmitting terminal, where the first carrier conveys a first set of synchronization signals, and a second carrier of the second set of carriers conveys a second set of synchronization signals. The operations of 1505 may be performed according to the methods described herein. In some examples, aspects of the operations of 1505 may be performed by a configuration receiving component as described with reference to FIGS. 6 through 9.

At 1510, the UE may identify at least a portion of system information associated with the second set of carriers based on the configuration. The operations of 1510 may be performed according to the methods described herein. In some examples, aspects of the operations of 1510 may be performed by a system information receiving component as described with reference to FIGS. 6 through 9.

At 1515, the UE may reselect to the second carrier of the second set of carriers based on the configuration for the second set of carriers. The operations of 1515 may be performed according to the methods described herein. In some examples, aspects of the operations of 1515 may be performed by a beam reselection component as described with reference to FIGS. 6 through 9.

At 1520, the UE may receive the second set of synchronization signals on the second carrier of the second set of carriers based on the configuration for the second set of carriers. The operations of 1520 may be performed according to the methods described herein. In some examples, aspects of the operations of 1520 may be performed by a beam reselection component as described with reference to FIGS. 6 through 9.

Figure 16:
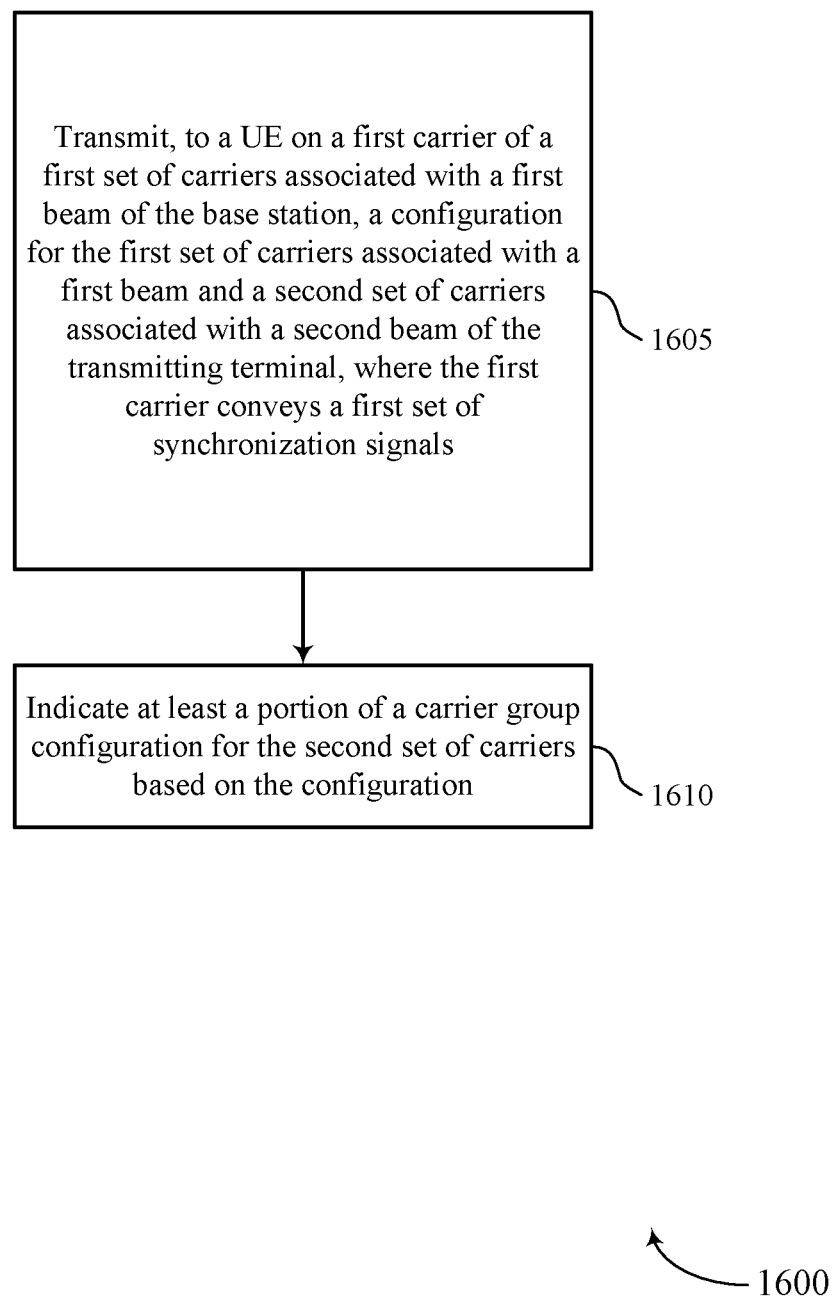

FIG. 16 shows a flowchart illustrating a method 1600 that supports beam reselection for narrowband non-terrestrial networks in accordance with aspects of the present disclosure. The operations of method 1600 may be implemented by a base station 105 or its components as described herein. For example, the operations of method 1600 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1605, the base station may transmit, to a UE on a first carrier of a first set of carriers associated with a first beam of the base station, a configuration for the first set of carriers associated with a first beam and a second set of carriers associated with a second beam of the transmitting terminal, where the first carrier conveys a first set of synchronization signals. The operations of 1605 may be performed according to the methods described herein. In some examples, aspects of the operations of 1605 may be performed by a configuration transmitting component as described with reference to FIGS. 10 through 13.

At 1610, the base station may indicate at least a portion of a carrier group configuration for the second set of carriers based on the configuration. The operations of 1610 may be performed according to the methods described herein. In some examples, aspects of the operations of 1610 may be performed by a system information indicating component as described with reference to FIGS. 10 through 13.

Figure 17:
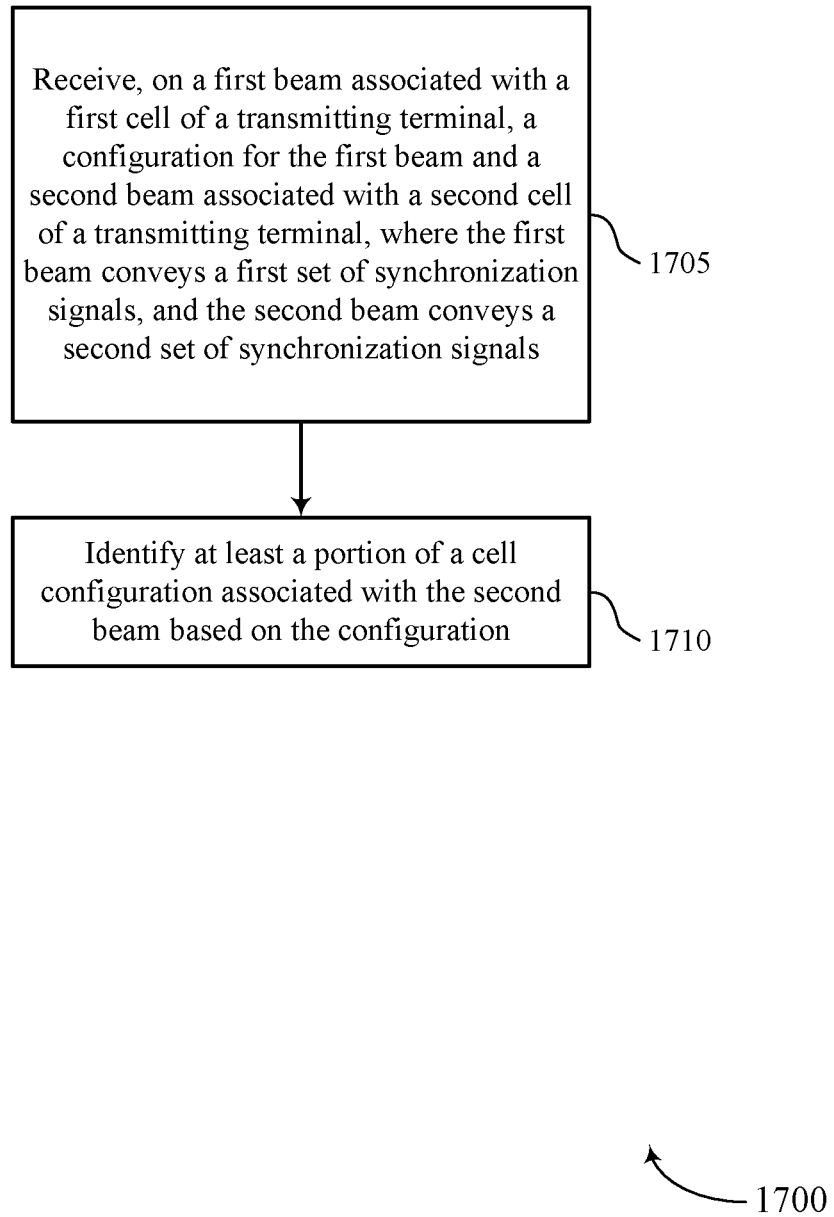

FIG. 17 shows a flowchart illustrating a method 1700 that supports beam reselection for narrowband non-terrestrial networks in accordance with aspects of the present disclosure. The operations of method 1700 may be implemented by a UE 115 or its components as described herein. For example, the operations of method 1700 may be performed by a communication manager as described with reference to FIGS. 6 through 9. In some examples, a UE may execute a set of instructions to control the functional elements of the UE to perform the described functions. Additionally or alternatively, a UE may perform aspects of the described functions using special-purpose hardware.

At 1705, the UE may receive, on a first beam associated with a first cell of a transmitting terminal, a configuration for the first beam and a second beam associated with a second cell of a transmitting terminal, where the first beam conveys a first set of synchronization signals, and the second beam conveys a second set of synchronization signals. The operations of 1705 may be performed according to the methods described herein. In some examples, aspects of the operations of 1705 may be performed by a cell configuration receiving component as described with reference to FIGS. 6 through 9.

At 1710, the UE may identify at least a portion of a cell configuration for the second beam based on the configuration. The operations of 1710 may be performed according to the methods described herein. In some examples, aspects of the operations of 1710 may be performed by a cell system information identifying component as described with reference to FIGS. 6 through 9.

Figure 18:
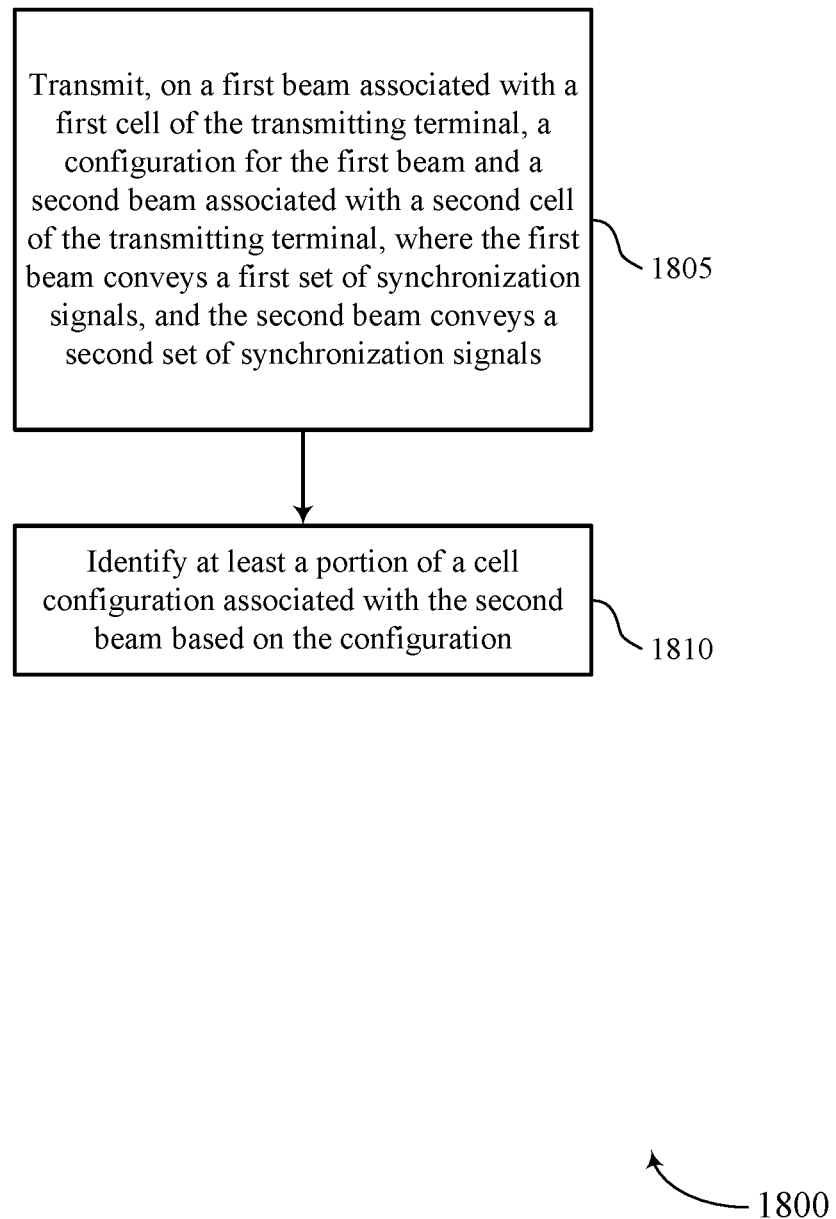

FIG. 18 shows a flowchart illustrating a method 1800 that supports beam reselection for narrowband non-terrestrial networks in accordance with aspects of the present disclosure. The operations of method 1800 may be implemented by a base station 105 or its components as described herein. For example, the operations of method 1800 may be performed by a communication manager as described with reference to FIGS. 10 through 13. In some examples, a base station may execute a set of instructions to control the functional elements of the base station to perform the described functions. Additionally or alternatively, a base station may perform aspects of the described functions using special-purpose hardware.

At 1805, the base station may transmit, on a first beam associated with a first cell of the transmitting terminal, a configuration for the first beam and a second beam associated with a second cell of the transmitting terminal, where the first beam conveys a first set of synchronization signals, and the second beam conveys a second set of synchronization signals. The operations of 1805 may be performed according to the methods described herein. In some examples, aspects of the operations of 1805 may be performed by a cell configuration transmitting component as described with reference to FIGS. 10 through 13.

At 1810, the base station may identify at least a portion of a cell configuration for the second beam based on the configuration. The operations of 1810 may be performed according to the methods described herein. In some examples, aspects of the operations of 1810 may be performed by a cell system information identifying component as described with reference to FIGS. 10 through 13.

The following provides an overview of aspects of the present disclosure:

Aspect 1: A method for wireless communications at a UE, comprising: receiving, on a first carrier of a first set of carriers associated with a first beam of a transmitting terminal, a configuration for the first set of carriers associated with the first beam and a second set of carriers associated with a second beam of the transmitting terminal, wherein the first carrier conveys a first set of synchronization signals; and identifying at least a portion of a carrier group configuration for the second set of carriers based at least in part on the configuration.

Aspect 2: The method of aspect 1, wherein a second carrier of the second set of carriers conveys a second set of synchronization signals.

Aspect 3: The method of any of aspects 1 through 2, wherein receiving the configuration comprises: receiving system information on the first carrier, wherein the system information corresponds to one or more carriers in one or more beams including at least the first and second beams.

Aspect 4: The method of any of aspects 1 through 3, wherein receiving the configuration comprises: receiving a cell configuration for a cell including at least the first set of carriers and the second set of carriers, wherein the cell configuration includes at least configurations for the first set of carriers and the second set of carriers.

Aspect 5: The method of aspect 4, further comprising: receiving a common system information on the first carrier for the cell, wherein the common system information is applied for at least the first set of carriers and the second set of carriers.

Aspect 6: The method of any of aspects 4 through 5, further comprising: receiving a second system information for the second set of carriers, wherein a first received system information for the first set of carriers is at least partially different from the second system information for the second set of carriers.

Aspect 7: The method of any of aspects 4 through 6, further comprising: receiving an indication of at least one carrier frequency corresponding to at least one carrier in the second set of carriers.

Aspect 8: The method of aspect 7, wherein the indication of the carrier frequency includes a frequency shift value from the first set of carriers.

Aspect 9: The method of aspect 8, wherein a second carrier of the second set of carriers is frequency shifted from the first carrier based at least in part on the frequency shift value, or each carrier of the second set of carriers is frequency shifted from corresponding carriers of the first set of carriers based at least in part on the frequency shift value.

Aspect 10: The method of any of aspects 7 through 9, wherein the indication of the carrier frequency includes one or more ARFCNs for the at least one carrier in the second set of carriers.

Aspect 11: The method of any of aspects 4 through 10, wherein the configuration includes scheduling information for at least a portion of system information associated with the second set of carriers.

Aspect 12: The method of any of aspects 1 through 11, wherein receiving the configuration comprises: receiving a cell configuration on the first set of carriers for a second cell including at least the second set of carriers, wherein a first cell includes at least the first set of carriers.

Aspect 13: The method of aspect 12, wherein the cell configuration includes an indication of at least one carrier frequency corresponding to at least one carrier in the second set of carriers.

Aspect 14: The method of any of aspects 12 through 13, wherein the cell configuration for the second cell includes scheduling information for at least a portion of system information associated with the second cell.

Aspect 15: The method of any of aspects 12 through 14, wherein the cell configuration comprises a plurality of cell configurations for a plurality of cells, the plurality of cells includes at least the first cell and the second cell.

Aspect 16: The method of any of aspects 12 through 15, wherein the cell configuration includes system information that is common for a plurality of cells.

Aspect 17: The method of aspect 16, further comprising: receiving identifiers for one or more corresponding cells of the plurality of cells at least partially having common system information.

Aspect 18: The method of any of aspects 12 through 17, further comprising: identifying a first portion of common system information among carriers of the first cell and a second portion of common system information among a first one or more carriers of the first cell and a second one or more carriers of the second cell, wherein the first portion of common system information is different from the second portion of common system information.

Aspect 19: The method of any of aspects 1 through 18, wherein receiving the configuration comprises: receiving an indication of one or more carriers of one or more sets of carriers, wherein each carrier of the one or more carriers conveys corresponding sets of synchronization signals, and wherein the one or more carriers are indicated as candidate carriers corresponding to different beams for a beam reselection.

Aspect 20: The method of aspect 19, further comprising: receiving a beam reselection indication to reselect to one of the candidate carriers, wherein the reselecting is based at least in part on the beam reselection indication.

Aspect 21: The method of aspect 20, wherein the beam reselection indication is received via DCI, a MAC CE, or both.

Aspect 22: The method of any of aspects 19 through 21, wherein each candidate carrier belongs to a same cell as the first carrier or belongs to a different cell from the first carrier.

Aspect 23: The method of any of aspects 1 through 22, further comprising: reselecting to a second carrier of the second set of carriers based at least in part on the configuration for the second set of carriers; and receiving a second set of synchronization signals on the second carrier of the second set of carriers based at least in part on the configuration for the second set of carriers.

Aspect 24: The method of any of aspects 1 through 23, further comprising: reselecting to a second carrier of the second set of carriers based at least in part on the configuration for the second set of carriers; and receiving a paging message on the second carrier prior to receiving a SIB on the second carrier based at least in part on the configuration.

Aspect 25: The method of any of aspects 1 through 24, wherein receiving the configuration comprises: receiving an idle mode beam reselection configuration.

Aspect 26: The method of aspect 25, wherein the idle mode beam reselection configuration comprises a first set of parameters for inter-cell reselection and a second set of parameters for intra-cell reselection, the parameters include one or more of a threshold, an offset, or a hysteresis.

Aspect 27: The method of any of aspects 25 through 26, wherein the first set of carriers and the second set of carriers correspond to a first cell, or the first set of carriers corresponds to the first cell and the second set of carriers corresponds to a second cell.

Aspect 28: The method of any of aspects 25 through 27, further comprising: reselecting to a second carrier of the second set of carriers while operating in an idle mode based at least in part on the idle mode beam reselection configuration.

Aspect 29: The method of any of aspects 25 through 28, wherein the idle mode beam reselection configuration comprises a first set of parameters for inter-cell reselection among cells within a cell group and a second set of parameters for inter-cell reselection among cells across different cell groups, the first set of parameters and the second set of parameters include one or more of a threshold, an offset, or a hysteresis.

Aspect 30: The method of any of aspects 1 through 29, wherein receiving the configuration comprises: receiving an MIB specific to a corresponding set of carriers.

Aspect 31: The method of aspect 30, wherein the MIB is specific to the first set of carriers, the second set of carriers, or another set of carriers.

Aspect 32: The method of any of aspects 30 through 31, wherein the MIB is specific to the corresponding set of carriers based at least in part on a payload content, a scrambling sequence, or both.

Aspect 33: The method of any of aspects 30 through 32, wherein the MIB indicates system information common between the first set of carriers and the corresponding set of carriers.

Aspect 34: The method of any of aspects 30 through 33, wherein the MIB indicates scheduling information for carrier group-specific system information for the corresponding set of carriers.

Aspect 35: The method of any of aspects 30 through 34, further comprising: identifying a default configuration for group-specific system information for the corresponding set of carriers based at least in part on the MIB.

Aspect 36: The method of any of aspects 30 through 35, wherein the MIB is received on a physical broadcast channel.

Aspect 37: The method of any of aspects 30 through 36, wherein the MIB indicates whether a carrier group-specific system information is present for the corresponding set of carriers.

Aspect 38: The method of any of aspects 1 through 37, wherein the transmitting terminal is a satellite of a non-terrestrial network.

Aspect 39: The method of any of aspects 1 through 38, wherein receiving the configuration comprises: receiving synchronization information on the first carrier, wherein the synchronization information corresponds to one or more other carriers in one or more other beams including at least the second beam.

Aspect 40: The method of aspect 39, wherein the synchronization information may comprise a relative or absolute frequency synchronization parameter, a relative or absolute time synchronization parameter, a time-domain pre-compensation parameter, a frequency-domain pre-compensation parameter, information associated with an MIB, or any combination thereof.

Aspect 41: The method of any of aspects 39 through 40, further comprising: synchronizing to the one or more other carriers based at least in part on the synchronization information.

Aspect 42: The method of any of aspects 1 through 41, wherein the first beam, the second beam, the first carrier, the first set of synchronization signals, the second set of synchronization signals, the first set of carriers, the second set of carriers, or any combination thereof, are used for narrowband internet of things communications.

Aspect 43: A method for wireless communications at a transmitting terminal, comprising: transmitting, to a UE on a first carrier of a first set of carriers associated with a first beam of the base station, a configuration for the first set of carriers associated with a first beam and a second set of carriers associated with a second beam of the transmitting terminal, wherein the first carrier conveys a first set of synchronization signals; and indicating at least a portion of a carrier group configuration for the second set of carriers based at least in part on the configuration.

Aspect 44: The method of aspect 43, wherein a second carrier of the second set of carriers conveys a second set of synchronization signals.

Aspect 45: The method of any of aspects 43 through 44, wherein transmitting the configuration comprises: transmitting system information on the first carrier, wherein the system information corresponds to one or more carriers in one or more beams including at least the first and second beams.

Aspect 46: The method of any of aspects 43 through 45, wherein transmitting the configuration comprises: transmitting a cell configuration for a cell including at least the first set of carriers and the second set of carriers, wherein the cell configuration includes at least the configuration for the first set of carriers and the second set of carriers.

Aspect 47: The method of aspect 46, further comprising: transmitting a common system information on the first carrier for the cell, wherein the common system information is applied for at least the first set of carriers and the second set of carriers.

Aspect 48: The method of any of aspects 46 through 47, further comprising: transmitting a second system information for the second set of carriers, wherein a first transmitted system information for the first set of carriers is at least partially different from the second system information for the second set of carriers.

Aspect 49: The method of any of aspects 46 through 48, further comprising: transmitting an indication of at least one carrier frequency corresponding to at least one carrier in the second set of carriers.

Aspect 50: The method of aspect 49, wherein the indication of the carrier frequency includes a frequency shift value from the first set of carriers.

Aspect 51: The method of aspect 50, wherein a second carrier is frequency shifted from the first carrier based at least in part on the frequency shift value, or each carrier of the second set of carriers is frequency shifted from corresponding carriers of the first set of carriers based at least in part on the frequency shift value.

Aspect 52: The method of any of aspects 49 through 51, wherein the indication of the carrier frequency includes one or more ARFCNs for at least one carrier in the second set of carriers.

Aspect 53: The method of any of aspects 46 through 52, wherein the configuration includes scheduling information for at least a portion of system information corresponding to the second set of carriers.

Aspect 54: The method of any of aspects 43 through 53, wherein transmitting the configuration comprises: transmitting a cell configuration on the first set of carriers for a second cell including at least the second set of carriers, wherein a first cell includes at least the first set of carriers.

Aspect 55: The method of aspect 54, wherein the cell configuration includes an indication of at least one carrier frequency corresponding to at least one carrier in the second set of carriers.

Aspect 56: The method of any of aspects 54 through 55, wherein the cell configuration for the second cell includes scheduling information for at least a portion of system information corresponding to the second cell.

Aspect 57: The method of any of aspects 54 through 56, wherein the cell configuration comprises a plurality of cell configurations for a plurality of cells, the plurality of cells includes at least the first cell and the second cell.

Aspect 58: The method of any of aspects 54 through 57, wherein the cell configuration includes system information that is common for a plurality of cells.

Aspect 59: The method of aspect 58, further comprising: transmitting identifiers for one or more corresponding cells of the plurality of cells at least partially having common system information.

Aspect 60: The method of any of aspects 54 through 59, further comprising: indicating a first portion of common system information among carriers of the first cell and a second portion of common system information among a first one or more carriers of the first cell and a second one or more carriers of the second cell, wherein the first portion of common system information is different from the second portion of common system information.

Aspect 61: The method of any of aspects 43 through 60, wherein transmitting the configuration comprises: transmitting an indication of one or more carriers of one or more sets of carriers, wherein each carrier of the one or more carriers conveys corresponding sets of synchronization signals, and wherein the one or more carriers are indicated as candidate carriers corresponding to different beams for a beam reselection.

Aspect 62: The method of aspect 61, further comprising: transmitting a beam reselection indication to reselect the UE to one of the candidate carriers.

Aspect 63: The method of aspect 62, wherein the beam reselection indication is transmitted via DCI, a MAC CE, or both.

Aspect 64: The method of any of aspects 61 through 63, wherein each candidate carrier belongs to a same cell as the first carrier or belongs to a different cell from the first carrier.

Aspect 65: The method of any of aspects 43 through 64, further comprising: reselecting the UE to a second carrier of the second set of carriers based at least in part on the configuration for the second set of carriers; and transmitting a second set of synchronization signals on the second carrier of the second set of carriers based at least in part on the configuration for the second set of carriers.

Aspect 66: The method of any of aspects 43 through 65, wherein transmitting the configuration comprises: transmitting an idle mode beam reselection configuration.

Aspect 67: The method of aspect 66, wherein the idle mode beam reselection configuration comprises a first set of parameters for inter-cell reselection and a second set of parameters for intra-cell reselection, the parameters include one or more of a threshold, an offset, or a hysteresis.

Aspect 68: The method of any of aspects 66 through 67, wherein the first set of carriers and the second set of carriers correspond to a first cell, or the first set of carriers corresponds to the first cell and the second set of carriers corresponds to a second cell.

Aspect 69: The method of any of aspects 66 through 68, further comprising: reselecting the UE to a second carrier of the second set of carriers while operating in an idle mode based at least in part on the idle mode beam reselection configuration.

Aspect 70: The method of any of aspects 66 through 69, wherein the idle mode beam reselection configuration comprises a first set of parameters for inter-cell reselection among cells within a cell group and a second set of parameters for inter-cell reselection among cells across different cell groups, the first set of parameters and the second set of parameters include one or more of a threshold, an offset, or a hysteresis.

Aspect 71: The method of any of aspects 43 through 70, wherein transmitting the configuration comprises: transmitting an MIB specific to a corresponding set of carriers.

Aspect 72: The method of aspect 71, wherein the MIB is specific to the first set of carriers, the second set of carriers, or another set of carriers.

Aspect 73: The method of any of aspects 71 through 72, wherein the MIB is specific to the corresponding set of carriers based at least in part on a payload content, a scrambling sequence, or both.

Aspect 74: The method of any of aspects 71 through 73, wherein the MIB indicates system information common between the first set of carriers and the corresponding set of carriers.

Aspect 75: The method of any of aspects 71 through 74, wherein the MIB indicates scheduling information for carrier group-specific system information for the corresponding set of carriers.

Aspect 76: The method of any of aspects 71 through 75, further comprising: indicating a default configuration for group-specific system information for the corresponding set of carriers based at least in part on the MIB.

Aspect 77: The method of any of aspects 71 through 76, wherein the MIB is transmitted on a physical broadcast channel.

Aspect 78: The method of any of aspects 71 through 77, wherein the MIB indicates whether a carrier group-specific system information is present for the corresponding set of carriers.

Aspect 79: The method of any of aspects 43 through 78, wherein transmitting the configuration comprises: transmitting synchronization information on the first carrier, wherein the synchronization information corresponds to one or more other carriers in one or more other beams including at least the second beam.

Aspect 80: The method of aspect 79, wherein the synchronization information may comprise a relative or absolute frequency synchronization parameter, a relative or absolute time synchronization parameter, a time-domain pre-compensation parameter, a frequency-domain pre-compensation parameter, information associated with a MIB, or any combination thereof.

Aspect 81: The method of any of aspects 79 through 80, further comprising: synchronizing the UE to the one or more other carriers based at least in part on the synchronization information.

Aspect 82: The method of any of aspects 43 through 81, wherein the transmitting terminal is a satellite of a non-terrestrial network.

Aspect 83: The method of any of aspects 43 through 82, wherein the first beam, the second beam, the first carrier, the first set of synchronization signals, the second set of synchronization signals, the first set of carriers, the second set of carriers, or any combination thereof, are used for narrowband internet of things communications.

Aspect 84: A method for wireless communications at a UE, comprising: receiving, on a first beam associated with a first cell of a transmitting terminal, a configuration for the first beam and a second beam associated with a second cell of a transmitting terminal, wherein the first beam conveys a first set of synchronization signals, and the second beam conveys a second set of synchronization signals; and identifying at least a portion of a cell configuration associated with the second beam based at least in part on the configuration.

Aspect 85: The method of aspect 84, further comprising: reselecting to the second beam based at least in part on the configuration for the second beam; and receiving the second set of synchronization signals on the second beam based at least in part on the configuration for the second beam.

Aspect 86: The method of any of aspects 84 through 85, wherein receiving the configuration comprises: receiving system information on the first beam, wherein the system information corresponds to one or more cells including at least the second cell.

Aspect 87: The method of any of aspects 84 through 86, wherein receiving the configuration comprises: receiving a common system information on the first cell, wherein the common system information is applied for at least the first cell and the second cell.

Aspect 88: The method of any of aspects 84 through 87, wherein receiving the configuration comprises: receiving a second system information on the first cell for the second cell, wherein a first received system information for the first cell is at least partially different from the second system information for the second cell.

Aspect 89: The method of any of aspects 84 through 88, wherein receiving the configuration comprises: receiving an indication of at least one carrier frequency corresponding to at least the second beam.

Aspect 90: The method of any of aspects 84 through 89, wherein the configuration includes scheduling information for at least a portion of system information associated with the second beam.

Aspect 91: The method of any of aspects 84 through 90, wherein receiving the configuration comprises: receiving an idle mode beam reselection configuration, wherein the UE reselects to the second beam based at least in part on the idle mode beam reselection configuration.

Aspect 92: The method of any of aspects 84 through 91, wherein the transmitting terminal is a satellite of a non-terrestrial network.

Aspect 93: The method of any of aspects 84 through 92, wherein the first beam, the second beam, the first cell, the second cell, the first set of synchronization signals, the second set of synchronization signals, or any combination thereof, are used for narrowband internet of things communications.

Aspect 94: A method for wireless communications at a transmitting terminal, comprising: transmitting, on a first beam associated with a first cell of the transmitting terminal, a configuration for the first beam and a second beam associated with a second cell of the transmitting terminal, wherein the first beam conveys a first set of synchronization signals, and the second beam conveys a second set of synchronization signals; and indicate at least a portion of a cell configuration associated with the second beam based at least in part on the configuration.

Aspect 95: The method of aspect 94, wherein transmitting the configuration comprises: reselecting the UE to the second beam based at least in part on the configuration; and transmitting the second set of synchronization signals on the second beam based at least in part on the configuration for the second beam.

Aspect 96: The method of any of aspects 94 through 95, wherein transmitting the configuration comprises: transmitting system information on the first beam, wherein the system information corresponds to one or more cells including at least the second cell.

Aspect 97: The method of any of aspects 94 through 96, wherein transmitting the configuration comprises: transmitting a common system information on the first cell, wherein the common system information is applied for at least the first cell and the second cell.

Aspect 98: The method of any of aspects 94 through 97, wherein transmitting the configuration comprises: transmitting a second system information on the first cell for the second cell, wherein a first transmitted system information for the first cell is at least partially different from the second system information for the second cell.

Aspect 99: The method of any of aspects 94 through 98, wherein transmitting the configuration comprises: transmitting an indication of at least one carrier frequency corresponding to at least the second beam.

Aspect 100: The method of any of aspects 94 through 99, wherein the configuration includes scheduling information for at least a portion of system information associated with the second beam.

Aspect 101: The method of any of aspects 94 through 100, further comprising: transmitting an idle mode beam reselection configuration, wherein the UE reselects to the second beam based at least in part on the idle mode beam reselection configuration.

Aspect 102: The method of any of aspects 94 through 101, wherein the transmitting terminal is a satellite of a non-terrestrial network.

Aspect 103: The method of any of aspects 94 through 102, wherein the first beam, the second beam, the first cell, the second cell, the first set of synchronization signals, the second set of synchronization signals, or any combination thereof, are used for narrowband internet of things communications.

Aspect 104: An apparatus for wireless communications at a UE, comprising a processor; memory coupled with the processor; and instructions stored in the memory and executable by the processor to cause the apparatus to perform a method of any of aspects 1 through 42.

Aspect 105: An apparatus for wireless communications at a UE, comprising at least one means for performing a method of any of aspects 1 through 42.

Aspect 106: A non-transitory computer-readable medium storing code for wireless communications at a UE, the code comprising instructions executable by a processor to perform a method of any of aspects 1 through 42.

Aspect 107: An apparatus for wireless communications at a transmitting terminal, comprising a processor; memory coupled with the processor; and instructions stored in the memory and executable by the processor to cause the apparatus to perform a method of any of aspects 43 through 83.

Aspect 108: An apparatus for wireless communications at a transmitting terminal, comprising at least one means for performing a method of any of aspects 43 through 83.

Aspect 109: A non-transitory computer-readable medium storing code for wireless communications at a transmitting terminal, the code comprising instructions executable by a processor to perform a method of any of aspects 43 through 83.

Aspect 110: An apparatus for wireless communications at a UE, comprising a processor; memory coupled with the processor; and instructions stored in the memory and executable by the processor to cause the apparatus to perform a method of any of aspects 84 through 93.

Aspect 111: An apparatus for wireless communications at a UE, comprising at least one means for performing a method of any of aspects 84 through 93.

Aspect 112: A non-transitory computer-readable medium storing code for wireless communications at a UE, the code comprising instructions executable by a processor to perform a method of any of aspects 84 through 93.

Aspect 113: An apparatus for wireless communications at a transmitting terminal, comprising a processor; memory coupled with the processor; and instructions stored in the memory and executable by the processor to cause the apparatus to perform a method of any of aspects 94 through 103.

Aspect 114: An apparatus for wireless communications at a transmitting terminal, comprising at least one means for performing a method of any of aspects 94 through 103.

Aspect 115: A non-transitory computer-readable medium storing code for wireless communications at a transmitting terminal, the code comprising instructions executable by a processor to perform a method of any of aspects 94 through 103.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
a processor;
memory coupled with the processor; and
instructions stored in the memory and executable by the processor to cause the apparatus to:
receive, on a first carrier of a first set of carriers associated with a first beam of a transmitting terminal, a configuration for the first set of carriers associated with the first beam and a second set of carriers associated with a second beam of the transmitting terminal, wherein the first carrier conveys a first set of synchronization signals, and wherein the second set of carriers is different from the first set of carriers; and
identify at least a portion of a carrier group configuration for the second set of carriers based at least in part on the configuration.

2. The apparatus of claim 1, wherein a second carrier of the second set of carriers conveys a second set of synchronization signals.

3. The apparatus of claim 1, wherein the instructions to receive the configuration are executable by the processor to cause the apparatus to:
receive system information on the first carrier, wherein the system information corresponds to one or more carriers in one or more beams including at least the first beam and the second beam.

4. The apparatus of claim 1, wherein the instructions to receive the configuration are executable by the processor to cause the apparatus to:
receive a cell configuration for a cell including at least the first set of carriers and the second set of carriers, wherein the cell configuration includes at least configurations for the first set of carriers and the second set of carriers.

5. The apparatus of claim 4, wherein the instructions are further executable by the processor to cause the apparatus to:
receive a common system information on the first carrier for the cell, wherein the common system information is applied for at least the first set of carriers and the second set of carriers.

6. The apparatus of claim 4, wherein the instructions are further executable by the processor to cause the apparatus to:
receive a second system information for the second set of carriers, wherein a first received system information for the first set of carriers is at least partially different from the second system information for the second set of carriers.

7. The apparatus of claim 4, wherein the instructions are further executable by the processor to cause the apparatus to:
receive an indication of at least one carrier frequency corresponding to at least one carrier in the second set of carriers, wherein the indication of the at least one carrier frequency includes a frequency shift value from the first set of carriers, or wherein the indication of the at least one carrier frequency includes one or more absolute radio frequency channel numbers for the at least one carrier in the second set of carriers.

8. The apparatus of claim 1, wherein the instructions to receive the configuration are executable by the processor to cause the apparatus to:
receive a cell configuration on the first set of carriers for a second cell including at least the second set of carriers, wherein a first cell includes at least the first set of carriers.

9. The apparatus of claim 8, wherein the cell configuration for the second cell includes scheduling information for at least a portion of system information associated with the second cell, or the cell configuration comprises a plurality of cell configurations for a plurality of cells including at least the first cell and the second cell, or the cell configuration includes system information that is common for the plurality of cells.

10. The apparatus of claim 8, wherein the instructions are further executable by the processor to cause the apparatus to:
identify a first portion of common system information among carriers of the first cell and a second portion of common system information among a first one or more carriers of the first cell and a second one or more carriers of the second cell, wherein the first portion of common system information is different from the second portion of common system information.

11. The apparatus of claim 1, wherein the instructions to receive the configuration are executable by the processor to cause the apparatus to:
receive an indication of one or more carriers of one or more sets of carriers, wherein each carrier of the one or more carriers conveys corresponding sets of synchronization signals, and wherein the one or more carriers are indicated as candidate carriers corresponding to different beams for a beam reselection.

12. The apparatus of claim 11, wherein the instructions are further executable by the processor to cause the apparatus to:
receive, via downlink control information, a medium access control (MAC) control element (CE), or both, a beam reselection indication to reselect to one of the candidate carriers, wherein the reselecting is based at least in part on the beam reselection indication.

13. The apparatus of claim 1, wherein the instructions are further executable by the processor to cause the apparatus to:
reselect to a second carrier of the second set of carriers based at least in part on the configuration for the second set of carriers; and
receive a second set of synchronization signals on the second carrier of the second set of carriers based at least in part on the configuration for the second set of carriers.

14. The apparatus of claim 1, wherein the instructions are further executable by the processor to cause the apparatus to:
reselect to a second carrier of the second set of carriers based at least in part on the configuration for the second set of carriers; and
receive a paging message on the second carrier prior to receiving a system information block on the second carrier based at least in part on the configuration.

15. The apparatus of claim 1, wherein the instructions to receive the configuration are executable by the processor to cause the apparatus to:
receive an idle mode beam reselection configuration; and
reselect to a second carrier of the second set of carriers while operating in an idle mode based at least in part on the idle mode beam reselection configuration.

16. The apparatus of claim 15, wherein:
the idle mode beam reselection configuration comprises a first set of parameters for inter-cell reselection and a second set of parameters for intra-cell reselection, and
the first set of parameters and the second set of parameters include one or more of a threshold, an offset, or a hysteresis.

17. The apparatus of claim 15, wherein the first set of carriers and the second set of carriers correspond to a first cell, or the first set of carriers corresponds to the first cell and the second set of carriers corresponds to a second cell.

18. The apparatus of claim 15, wherein:
the idle mode beam reselection configuration comprises a first set of parameters for inter-cell reselection among cells within a cell group and a second set of parameters for inter-cell reselection among cells across different cell groups, and
the first set of parameters and the second set of parameters include one or more of a threshold, an offset, or a hysteresis.

19. The apparatus of claim 1, wherein the instructions to receive the configuration are executable by the processor to cause the apparatus to:
receive, on a physical broadcast channel, a master information block specific to a corresponding set of carriers.

20. The apparatus of claim 19, wherein the master information block is specific to the first set of carriers, the second set of carriers, or another set of carriers.

21. The apparatus of claim 19, wherein the master information block is specific to the corresponding set of carriers based at least in part on a payload content, a scrambling sequence, or both.

22. The apparatus of claim 19, wherein the master information block indicates system information common between the first set of carriers and the corresponding set of carriers, scheduling information for carrier group-specific system information for the corresponding set of carriers, or both.

23. The apparatus of claim 19, wherein the instructions are further executable by the processor to cause the apparatus to:
identify a default configuration for group-specific system information for the corresponding set of carriers based at least in part on the master information block.

24. The apparatus of claim 19, wherein the master information block indicates whether a carrier group-specific system information is present for the corresponding set of carriers.

25. The apparatus of claim 1, wherein the instructions to receive the configuration are executable by the processor to cause the apparatus to:
receive synchronization information on the first carrier comprising a relative or absolute frequency synchronization parameter, a relative or absolute time synchronization parameter, a time-domain pre-compensation parameter, a frequency-domain pre-compensation parameter, information associated with a master information block, or any combination thereof, wherein the synchronization information corresponds to one or more other carriers in one or more other beams including at least the second beam; and
synchronize to the one or more other carriers based at least in part on the synchronization information.

26. An apparatus for wireless communications at a user equipment (UE), comprising:
a processor;
memory coupled with the processor; and
instructions stored in the memory and executable by the processor to cause the apparatus to:
receive, on a first beam associated with a first cell of a transmitting terminal, a configuration for the first beam and a second beam associated with a second cell of the transmitting terminal, wherein the first beam conveys a first set of synchronization signals and the second beam conveys a second set of synchronization signals, and wherein the second cell is different from the first cell; and
identify at least a portion of a cell configuration associated with the second beam based at least in part on the configuration.

27. The apparatus of claim 26, wherein the instructions are further executable by the processor to cause the apparatus to:
reselect to the second beam based at least in part on the configuration for the second beam; and
receive the second set of synchronization signals on the second beam based at least in part on the configuration for the second beam.

28. The apparatus of claim 26, wherein the instructions to receive the configuration are executable by the processor to cause the apparatus to:
- receive system information on the first beam, wherein the system information corresponds to one or more cells including at least the second cell.

29. The apparatus of claim 26, wherein the instructions to receive the configuration are executable by the processor to cause the apparatus to:
- receive at least one of a common system information on the first cell, wherein the common system information is applied for at least the first cell and the second cell, or a second system information on the first cell for the second cell, wherein a first received system information for the first cell is at least partially different from the second system information for the second cell.

30. The apparatus of claim 26, wherein the configuration includes scheduling information for at least a portion of system information associated with the second beam.

* * * * *